(12) United States Patent
Morken et al.

(10) Patent No.: US 7,939,602 B2
(45) Date of Patent: May 10, 2011

(54) GOLF BALLS CONTAINING IONOMERS AND POLYAMINES OR TERTIARY POLYAMIDES

(75) Inventors: Peter A. Morken, Wilmington, DE (US); Charles John Talkowski, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 375 days.

(21) Appl. No.: 12/215,764

(22) Filed: Jun. 30, 2008

(65) Prior Publication Data

US 2009/0325733 A1 Dec. 31, 2009

(51) Int. Cl.
- *C08L 33/02* (2006.01)
- *C08K 5/3435* (2006.01)
- *A63B 37/12* (2006.01)
- *A63B 37/00* (2006.01)

(52) U.S. Cl. ........ 525/186; 525/185; 525/201; 525/203; 525/205; 525/329.9; 525/374; 525/375; 525/381; 524/102; 524/103; 473/373; 473/374; 473/385

(58) Field of Classification Search ........................ None
See application file for complete search history.

(56) References Cited

U.S. PATENT DOCUMENTS

| | | | |
|---|---|---|---|
| 3,264,272 A | 8/1966 | Rees | |
| 3,471,460 A | 10/1969 | Rees | |
| 4,351,931 A | 9/1982 | Armitage | |
| 4,532,187 A * | 7/1985 | Hoenig et al. | 428/457 |
| 4,732,944 A | 3/1988 | Smith, Jr. | |
| 5,156,405 A * | 10/1992 | Kitaoh et al. | 473/385 |
| 5,246,991 A * | 9/1993 | Igarashi et al. | 524/99 |
| 5,605,967 A * | 2/1997 | Egashira et al. | 525/221 |
| 6,241,625 B1 | 6/2001 | Yokota et al. | |
| 6,319,154 B1 | 11/2001 | Yoshida et al. | |
| 7,144,938 B1 | 12/2006 | Feinberg et al. | |
| 7,160,954 B2 | 1/2007 | Zieske et al. | |
| 2002/0147280 A1 | 10/2002 | Rajagopalan | |
| 2003/0149175 A1 * | 8/2003 | Feinberg | 525/70 |
| 2003/0224875 A1 | 12/2003 | Takesue et al. | |
| 2005/0074622 A1 * | 4/2005 | Vogel et al. | 428/516 |
| 2005/0221077 A1 * | 10/2005 | Domine et al. | 428/323 |
| 2006/0014898 A1 | 1/2006 | Kim | |
| 2007/0289693 A1 | 12/2007 | Anderson et al. | |

FOREIGN PATENT DOCUMENTS

| | | | |
|---|---|---|---|
| JP | 1997296082 | | 11/1997 |
| JP | 3540453 | | 4/2004 |
| JP | 2005054019 | * | 3/2005 |
| JP | 2005263868 | | 9/2005 |
| WO | 02/47769 A1 | | 6/2002 |
| WO | 2008/013700 A2 | | 1/2008 |
| WO | 2009/064863 A2 | | 5/2009 |

OTHER PUBLICATIONS

Cytec product literature for CYASORB UV-3346; no date.*
Hirasawa et al., Effect of Organic Amine Type on the Structure and Properties of the Complex ZN (II) Salts of Ethylene-Methacrylic Acid Copolymer with Organic Amines, Journal of Applied Polymer Science, 1991, vol. 42:621-628.
PCT International Search Report and Written Opinion for International Application No. PCT/US2009/048585, dated Sep. 30, 2009.

\* cited by examiner

*Primary Examiner* — David Buttner

(57) ABSTRACT

Provided herein are compositions comprising an ionomer and a polyamine or a tertiary polyamide. The polyamine and the tertiary polyamide have a molecular weight of greater than 500 Da and do not contain an ester moiety or a primary amine moiety. The polyamine comprises at least three moieties that are tertiary amines or hindered secondary amines, and the polyamide comprises tertiary amide moieties and no secondary or primary amide moieties. The compositions may optionally include a filler. Further provided are articles such as golf balls and films containing these compositions.

17 Claims, No Drawings

GOLF BALLS CONTAINING IONOMERS AND POLYAMINES OR TERTIARY POLYAMIDES

BACKGROUND OF THE INVENTION

1. Field of the Invention

The invention relates to compositions comprising ionomers and polyamines or tertiary polyamides and articles such as golf balls and films containing the compositions.

2. Description of Related Art

Several patents and publications are cited in this description in order to more fully describe the state of the art to which this invention pertains. The entire disclosure of each of these patents and publications is incorporated by reference herein.

Golf balls and golf ball components may be formed from a variety of compositions, which provides a golf ball manufacturer the ability to alter the feel and aerodynamic characteristics of a particular ball.

For example, typical premium golf balls include wound balls, two-piece balls and multilayer balls. Wound balls typically have a spherical molded center, elastomeric thread-like material wound around the center, and either a thermoplastic or thermoset cover. "Two-piece" balls typically have a spherical molded core covered with a thermoplastic or thermoset material. "Multilayer" balls typically have a spherical molded core and one or more intermediate layers or mantles between the core and a thermoplastic or thermoset cover.

Golf ball covers formed from balata allow a highly skilled golfer to achieve spin rates sufficient to more precisely control ball direction and distance, particularly on shorter shots. Balata covered golf balls are easily damaged, however, which discourages the average golfer from using such balls. To remedy this durability issue, manufacturers have used ionomer resins as a cover material. Ionomers are copolymers of alpha olefins, particularly ethylene, and $C_{3-8}$ $\alpha,\beta$ ethylenically unsaturated carboxylic acid, wherein the acid moieties of the copolymers are at least partially neutralized. U.S. Pat. No. 3,264,272 (Rees) teaches methods for making such ionomers from acid copolymers. A process for preparing the acid copolymers on which the ionomers are based is described in U.S. Pat. No. 4,351,931.

The degree of neutralization of the acid copolymer may vary over a wide range, and essentially any cation may be suitable as a counterion to the carboxylate groups in the ionomers. Typical cations include lithium, sodium, potassium, magnesium, calcium, barium, lead, tin, zinc, aluminum, and combinations of two or more of such cations. Neutralization of 90% of the carboxylic acid moieties in the acid copolymer, and higher levels of neutralization, including up to 100%, are known. These relatively high degrees of neutralization, however, may result in a loss of melt-processability or properties such as elongation and toughness. This factor increases in significance for copolymers with high acid levels.

While ionomer covered golf balls possess virtually cut-proof covers, their spin and feel may be inferior compared to balata covered balls. Polyurethanes and polyureas have also been recognized as useful materials for golf ball covers. Golf ball covers made of these materials have durability comparable to that of covers made from ionomer resins, but have the softer feel of a balata cover. Golf balls with a polyurethane or polyurea cover do not fully match ionomer resin golf balls with respect to the resilience or rebound of the golf ball cover, however. This property is in part a function of the initial velocity of a golf ball after impact with a golf club. Polyurethane and polyurea covers also have inferior moisture barrier properties compared to ionomer covers.

Ethylene acid copolymers neutralized by reaction with diamines are described in U.S. Pat. No. 3,471,460. A composition containing an ethylene/methacrylic acid copolymer neutralized by reaction with "N,N'-tetramethyl hexamethylene diamine", with no metal cations, exhibited increased stiffness, compared to the non-neutralized acid copolymer, when measured according to ASTM D-747-58T.

An ionomer neutralized by reaction with a polyamine, preferably a diamine, that contains at least one R—$CH_2$—$NH_2$ group, and optionally partially neutralized with a base comprising a metal cation, is described in U.S. Pat. No. 4,732,944. This composition is used in films and glass laminates.

An ionomer composition comprising an ethylene acid copolymer neutralized by reaction with a "basic metal ion salt" and a compound comprising both an amine and a carboxylic acid in the same molecule is described in U.S. Patent Application Publication No. 2006/0014898. This composition is used in golf balls and sports equipment. The composition is reported to have a higher flex modulus than a comparative ionomer not containing the compound comprising both an amine and a carboxylic acid in the same molecule.

An ionomer composition having greater than about 70 percent of the acid groups neutralized by reaction with a neutralizing component including ammonium salts and/or monoamine salts is described in U.S. Pat. No. 7,160,954. This composition is used in golf balls. The composition is reported to have a lower flex modulus than a comparative ionomer not containing ammonium salts and/or monoamine salts.

Ionomer compositions neutralized by reaction with various amines are described in *Journal of Applied Polymer Science*, 1991, 42, 621-628. An ionomer composition neutralized by reaction with hexamethylene tetramine (HMT), a tertiary polyamine with molecular weight of 140 Da (Daltons), is reported to have a lower flex modulus than a comparative ionomer not containing HMT.

Japanese Patent No. 3540453 discloses an ionomer composition modified by the addition of $H_2N$—$[CH_2RCH_2NHCH_2CH(OH)CH_2NH]_n$—$CH_2RCH_2NH_2$, wherein R is a divalent alicycle or an aromatic hydrocarbon group, and $1 \leq n \leq 20$. Japanese Patent Application JP1997-296082 discloses a similar composition wherein a condensed cyclic compound having two or more aminoalkyl groups is also present. Japanese Patent Application JP2005-263868 discloses an ionomer composition modified by a diamine compound wherein weight change begins at $\geq 150°$ C., as determined by a gravimetric method according to JIS K7120. An example of the amine is reported as "4 and 4-diaminohexylmethane", believed to be 4,4'-diaminodicyclohexylmethane.

It is desirable to provide a high performance material to be used in a structural layer of a golf ball, such as a cover, intermediate layer, core or center. In particular it is desirable to provide resins that have a balance of high coefficient of restitution (COR), high flex modulus, low moisture transmission, and good durability. It is also desirable that the compositions have melt properties suitable for injection molding, and in particular for injection molding in thin layers.

SUMMARY OF THE INVENTION

Accordingly, provided herein is a thermoplastic composition comprising:

(a) an E/X/Y ethylene acid copolymer wherein E represents copolymerized units of ethylene, X represents copolymerized units of $C_3$ to $C_8$ $\alpha,\beta$ ethylenically unsaturated carboxylic acid, and Y represents copolymerized units of softening comonomer preferably selected from the group consisting of vinyl acetate, alkyl acrylate and alkyl methacrylate, wherein the alkyl groups have from 1 to 8 carbon atoms, wherein the amount of X is about 2 to about 30 weight % of the E/X/Y copolymer, and the amount of Y is 0 to about 45 weight % of the E/X/Y copolymer, based on the total weight of the ethylene acid copolymer, wherein at least a portion of the acid moieties of the E/X/Y acid copolymer are neutralized to form an ionomer comprising salts of alkali metal, an alkaline earth metal, and/or transition metal cations;

(b) a polyamine or polyamide having a molecular weight of greater than 500 Da, not containing an ester moiety or a primary amine moiety, wherein the polyamine comprises at least three moieties that are tertiary amines or hindered secondary amines, and wherein the polyamide comprises tertiary amide moieties and no secondary or primary amide moieties; and optionally (c) a filler.

Also provided are articles prepared from the compositions, such as golf balls. One golf ball comprises a core and a cover and optionally at least one intermediate layer positioned between the core and the cover, wherein the core, the cover or the intermediate layer(s) when present comprises or is prepared from the thermoplastic composition described above.

Further provided is a film prepared from the thermoplastic composition described above.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

Finally, when an article, such as a golf ball, is described as including more than one layer or component that comprises or is prepared from a particular composition, for example "wherein the core or the cover comprises or is prepared from the thermoplastic composition described herein", that particular composition may be the same or different in each of the layers or components.

Resins having a high flex modulus have previously been prepared using ionomers with relatively high levels of acid comonomer. Using this approach, however, a limit of about 90 kpsi in flex modulus has been reached. It is desired, nevertheless, to use resins having a flex modulus greater than 90 kpsi, provided other properties such as COR, moisture transmission, durability and moldability remain acceptable.

It has now surprisingly been discovered that resins having a high coefficient of restitution (COR), high flex modulus, low moisture transmission, and good durability are obtained by blending ionomers with a polyamine containing at least three amine groups. More specifically, these polyamines are tertiary amines or hindered secondary amines or polyamides comprising tertiary amides.

Acid Copolymers

The acid copolymers used to make the compositions described herein are preferably "direct" acid copolymers. "Direct" copolymers are polymers in which the copolymerized monomers are part of the polymer backbone or chain. They may be polymerized by adding all monomers simultaneously. In contrast, in graft copolymers, another comonomer is attached to non-terminal repeat units in an existing polymer chain, often by a subsequent free radical reaction.

The acid copolymers are preferably alpha olefin, particularly ethylene, $C_3$ to $C_8$, $\alpha,\beta$-ethylenically unsaturated carboxylic acid, particularly acrylic and methacrylic acid, copolymers. They may optionally contain a third softening monomer. By "softening", it is meant that the polymer is made less crystalline. Suitable "softening" comonomers are monomers selected from alkyl acrylate and alkyl methacrylate, wherein the alkyl groups have from 1 to 8 carbon atoms, and vinyl acetate.

The ethylene acid copolymers can be described as E/X/Y copolymers where E represents copolymerized units of ethylene, X represents copolymerized units of the $\alpha,\beta$ ethylenically unsaturated carboxylic acid, and Y represents copolymerized units of a softening comonomer. X is present in 2-30 weight % of the polymer, and Y is present in from 0 to 45 weight % of the polymer. That is, the amount of X is 2 to 30 weight %, and the amount of Y is 0 to 45 weight %, based on the total weight of the E/X/Y copolymer. An E/X/Y copolymer wherein Y is 0 weight % of the copolymer may be considered an E/X dipolymer. When Y is present in the E/X/Y copolymer (i.e., an E/X/Y terpolymer), it may be present in an amount from about 0.1 weight % to 45 weight % of the copolymer, preferably from 5 to 35, or from 5 to 25 weight % of the copolymer.

Preferred are copolymers wherein Y is 0% of the copolymer (that is, an E/X dipolymer). Preferred are dipolymers wherein the $C_3$ to $C_8$ $\alpha,\beta$-ethylenically unsaturated carboxylic acid are acrylic acid or methacrylic acid. Specifically preferred acid copolymers include ethylene/acrylic acid and ethylene/methacrylic acid dipolymers.

When combined with other components as described herein, an ethylene dipolymer consisting essentially of copolymerized comonomers of ethylene and from about 10 to about 24 weight % of copolymerized comonomers of $C_3$ to $C_8$ $\alpha,\beta$ ethylenically unsaturated carboxylic acid is particularly useful for preparing compositions which have a balance of high coefficient of restitution (COR), high flex modulus, low moisture transmission, moldability and good durability. Preferably, the E/X dipolymer may include about 14 to about 22 weight %, more preferably 18 to about 22 weight %, of the copolymerized carboxylic acid.

Of note are a dipolymer comprising ethylene and about 15.4 weight % of acrylic acid, a dipolymer comprising ethylene and about 18 weight % of acrylic acid, and a dipolymer comprising ethylene and about 21 weight % of acrylic acid. Ethylene/acrylic acid dipolymers are of note because a given weight of acrylic acid will provide more acid moieties than an equal weight of methacrylic acid.

Further of note is a dipolymer comprising ethylene and about 19 weight % of methacrylic acid. Also of note is a dipolymer comprising ethylene and about 15 weight % of methacrylic acid.

More preferably, the dipolymer may include 18 to 20 weight % of copolymerized methacrylic acid, or about 21 weight % of copolymerized acrylic acid.

Ethylene acid dipolymers with high levels of acid can be prepared through the use of "co-solvent technology" as described in U.S. Pat. No. 5,028,674 or by employing somewhat higher pressures than those at which copolymers with lower acid levels can be prepared.

The E/X/Y copolymers may have melt index flow rates in the range of about 10 g/10 min to about 400 g/10 min, or greater, measured at 190° C. using a 2160 g weight. Preferably, the copolymers have melt index flow rates of about 50 to about 300 g/10 min. Of note is a dipolymer comprising ethylene and 19 weight % of methacrylic acid having a melt index of 250 g/10 min.

Mixtures of acid copolymers are suitable, provided the properties, such as melt index, of the mixture fall within the ranges described above. For example, two or more E/X dipolymers having differing amounts of X and/or differing melt indices may be used. Also, an E/X dipolymer and an E/X/Y terpolymer (wherein Y is present in the copolymer in an amount from 0.1 to 45 weight %, preferably from 0.1 to 35 weight %) may be mixed.

Ionomers

Unmodified, melt processible ionomers can be prepared from acid copolymers described above by methods known in the art of preparing ionomers. By "unmodified", it is meant that the ionomers are not blended with any material that has been added for the purpose of modifying the properties of the unblended ionomer. For example, the polyamines and polyamides described herein are considered modifiers. Unmodified ionomers include partially neutralized acid copolymers, particularly copolymers prepared from copolymerization of ethylene and acrylic acid or methacrylic acid. The unmodified ionomers may be neutralized to any level that does not result in an intractable (i.e., not melt processible) polymer, or one that does not have useful physical properties. Preferably, about 15 to about 90%, more preferably about 30 to about 75% of the acid moieties of the acid copolymer are neutralized to form carboxylate groups. The ionomers further comprise, as counterions, one or more cations. Although any positively charged moiety may be suitable, the ionomers used herein preferably comprise cations of one or more alkali metals, alkaline earth metals, and/or transition metals.

Preferred cations for use in the unmodified ionomers include cations of lithium, sodium, potassium, magnesium, calcium, barium, lead, tin, zinc or aluminum, or combinations of two or more of these cations. Of note are sodium, calcium, potassium and lithium cations. Magnesium and zinc are preferred, and zinc is more preferred.

Preferably at least 20 equivalent %, at least 35 equivalent %, at least 50 equivalent %, or at least 75 equivalent % of the cations in the composition are magnesium cations. More preferably at least 20 equivalent %, at least 35 equivalent %, at least 50 equivalent %, or at least 75 equivalent % of the cations in the composition are zinc cations.

Of note is an ionomer made from a dipolymer comprising ethylene and 19 weight % of methacrylic acid neutralized with sufficient ZnO to produce an ionomer having an MI of 4.0. Also of note is an ionomer made from a dipolymer comprising ethylene and 15 weight % of methacrylic acid neutralized with ZnO.

Polyamines or Polyamides

The thermoplastic composition also includes a polyamine compound or a polyamide compound having a molecular weight of greater than 500 Da, not containing an ester moiety or a primary amine moiety, wherein the polyamine comprises at least three moieties that are tertiary amines or hindered secondary amines and wherein the polyamide comprises tertiary amide moieties and no secondary or primary amide moieties.

"Hindered" means that sterically bulky groups are adjacent to the secondary amine, such as tertiary or quaternary carbon atoms. The polyamines may be monomeric, oligomeric or polymeric. Preferred polyamines have molecular weight greater than 1000 Da, or greater than 1500 Da.

Examples of hindered secondary amine moieties include 2,2,6,6-tetramethylpiperidine and related materials such as 4-amino-2,2,6,6-tetramethylpiperidine. Polyamine derivatives of these monoamines having molecular weights above 500 Da may be prepared by combining by covalent bonding at least three of these secondary amine moieties.

Some Hindered Amine Light Stabilizers (HALS) marketed under the tradename CHIMASSORB by Ciba (CIBA) Specialty Chemicals, Vienna, Austria are examples of suitable polyamines.

One HALS that may be used is CHIMASSORB 119, having the chemical structure R—NH—$(CH_2)_3$—NR—$(CH_2)_2$—NR—$(CH_2)_3$—NH—R, where R is

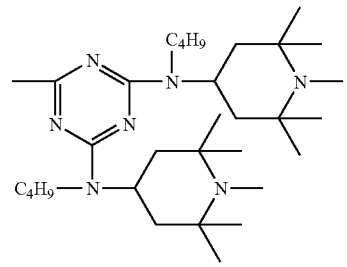

In addition, other high molecular weight monomeric HALS may be used, such as CHIMASSORB 944 or CHIMASSORB 2020. CHIMASSORB 944, poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]], has the following chemical structure:

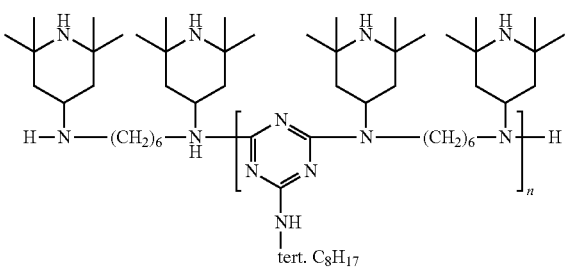

CHIMASSORB 2020 has the following chemical structure:

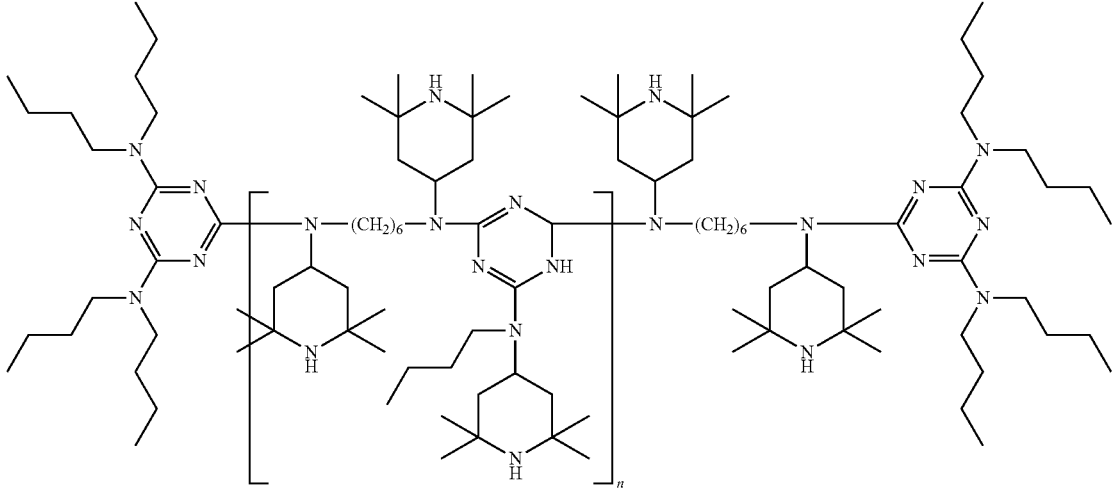

Polyamides comprising tertiary amides include polyvinylpyrrolidone (PVP) and poly(2-ethyl oxazoline). Tertiary amide moieties are those that do not include an N—H bond. Secondary amides have one N—H bond and primary amides have an $NH_2$ moiety. Notably, these polyamides can function as Lewis bases.

Polyvinylpyrrolidone, or Povidone, CA number [9003-39-8], Merck Index, 13, 7783, is available commercially from International Specialty Products of Wayne, N.J., as a series of products having average molecular weights of about 10,000 to about 1,300,000 Da or more (e.g about 10,000 Da, about 29,000 Da, about 55,000 Da, about 700,000 Da or about 1,300,000 Da). Copolymers of vinyl pyrrolidone, such as poly(1-vinylpyrrolidone-co-styrene), CA number [25086-29-7], may also be used.

Poly(2-ethyl oxazoline), or N-propionyl substituted linear polyethylenimine, CA number [25805-17-8], is available commercially from International Specialty Products as a series of products having average molecular weights of about 50,000 to about 500,00 Da or more (e.g. about 50,000 Da, about 200,000 Da or about 500,00 Da). Of note is the material having average molecular weight of about 50,000 Da, which is commercially available under the tradename AQUAZOL 50.

A number of provisos apply to the present description. For example, polyamides containing secondary amide moieties, such as nylons, are not contemplated for use in the thermoplastic composition described herein. In addition, ester moieties and primary amine moieties are not desirable in the polyamine or polyamide. Without being bound by theory, esters or primary amines may negatively interact with the ionomer, reducing melt flow.

Combinations of two or more of the suitable polyamine or polyamide additives may be used in the thermoplastic compositions, however. Polyamides may be preferred for use in some of the thermoplastic compositions described herein.

The amount of polyamine or polyamide may be from about 1 to about 40 weight %, preferably about 3 to about 40 weight %, about 5 to about 35 weight %, about 10 to about 30 weight % or about 15 to about 25 weight %, based on the total weight of the thermoplastic composition.

In summary, some preferred thermoplastic compositions comprise an E/X dipolymer comprising 14 to 20 wt % of (meth)acrylic acid, neutralized to form an ionomer comprising zinc cations. The preferred thermoplastic compositions further comprise 15 to 25 wt %, based on the total weight of the thermoplastic composition, of a suitable polyamine or polyamide, and more preferably comprise a polyamine modifier.

Other Components

The thermoplastic compositions may optionally comprise small amounts of other materials commonly used and well known in the polymer art. Such materials include conventional additives used in polymeric materials including plasticizers; stabilizers, including viscosity stabilizers and hydrolytic stabilizers; primary and secondary antioxidants, such as for example IRGANOX 1010 (commercially available from CIBA); ultraviolet ray absorbers and stabilizers; anti-static agents; dyes; pigments or other coloring agents; fire-retardants; lubricants; processing aids; slip additives; antiblock agents such as silica or talc; release agents; other components known in the art of golf ball manufacture to be useful but not critical to golf ball performance and/or acceptance, such as inorganic fillers as described below, acid copolymer waxes, such as for example Honeywell wax AC540, $TiO_2$, which is used as a whitening agent, optical brighteners, and surfactants; and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities that are generally from 0.01 to 15 weight %, preferably from 0.01 to 10 weight %, so long as they do not detract from the basic and novel characteristics of the composition and do not significantly adversely affect the performance of the composition or of the golf balls prepared from the composition. In this connection, the weight percentages of such additives are not included in the total weight percentages of the thermoplastic compositions defined herein. Typically, many such additives may be present in from 0.01 to 5 weight %, based on the total weight of the thermoplastic composition.

The optional incorporation of such conventional ingredients into the compositions can be carried out by any known process. This incorporation can be carried out, for example, by dry blending, by extruding a mixture of the various constituents, by the conventional masterbatch technique, or the like. See, again, the *Kirk-Othmer Encyclopedia*.

Filler

Various fillers may be added to compositions to reduce cost, to affect rheological and mixing properties such as density, flex modulus, mold release, and/or melt flow index and the like, to adjust physical properties such as the modulus, tear strength and the like, to increase or decrease weight, and/or to reinforce the material. The amount of filler employed is primarily a function of weight requirements and distribution of the golf ball. The fillers may be used to adjust the properties of a golf ball layer, to reinforce the layer, or for any other purpose.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those of skill in the art.

The filler may be chosen to impart additional density to compositions of the previously described components, the selection being dependent upon the type of golf ball desired (i.e., one-piece, two-piece, wound or multilayer), as will be more fully detailed below. The filler may be included in one or more layers of the golf ball. Generally, the filler will be inorganic, having a density from about 4 grams/cubic centimeter (g/cc), or from about 5 g/cc to about 10 g/cc or higher and may be present in amounts between 0 and about 60 weight % based on the total weight of the thermoplastic composition. Examples of useful fillers include metals such as titanium, tungsten, aluminum, bismuth, nickel, molybdenum, iron, steel, lead, copper, brass, boron, boron carbide whiskers, bronze, cobalt, beryllium, zinc, tin; metal oxides including zinc oxide, iron oxide, aluminum oxide, tin oxide, titanium oxide, magnesium oxide, zinc oxide and zirconium oxide; as well as other well known corresponding salts and oxides thereof. Other preferred fillers include barium sulfate, lead silicate, tungsten carbide, limestone (ground calcium/magnesium carbonate), zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind and ground flash filler, and mixtures of two or more of any suitable fillers. It is preferred that the filler materials be non-reactive or almost non-reactive.

Fillers may be employed in a finely divided form, for example, in a size generally less than about 20 mesh U.S. standard size, preferably from about 100 mesh to about 1000 mesh, except for fibers and flock, which are generally elongated. Flock and fiber sizes are desirably small enough to facilitate processing. Filler particle size will depend upon desired effect, cost, ease of addition, and dusting considerations.

Fillers may also be used to modify the weight of the core or at least one additional layer for specialty balls, e.g., a lower weight ball is preferred for a player having a low swing speed.

Blowing or Foaming Agent(s)

The compositions may be foamed by the addition of at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Useful blowing or foaming agents include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition may be formed by blending microspheres with the composition either during or before the molding process. Polymeric, ceramic, metal, and glass microspheres are useful, and may be solid or hollow and filled or unfilled. In particular, microspheres up to about 1000 micrometers in diameter are useful.

Either injection molding or compression molding may be used to form a layer or a core including a foamed polymeric material.

Other Ionomer Compositions

Any golf ball or golf ball component described herein may comprise or be prepared from an ionomer composition. As used herein, the term "ionomer composition" refers to a composition that comprises an ionomer and that is different from the thermoplastic composition described herein. For example, the ionomer composition may be modified or unmodified, but it may not be modified with a polyamine or polyamide that has a molecular weight of less than 500 Da; or with a polyamine or polyamide that contains an ester moiety or a primary amine moiety; or with a polyamine that does not comprise at least three moieties that are tertiary amines or hindered secondary amines; or with a polyamide that comprises secondary or primary amide moieties and no tertiary amide moieties. Moreover, the golf balls or golf ball components described herein may comprise or be prepared from a blend of the thermoplastic compositions described herein with one or more ionomer compositions.

Suitable E/X/Y copolymers for use in the ionomer compositions are as described above with respect to the thermoplastic compositions. Suitable neutralization levels are from 0 to 100%, preferably 50% to 100%, 50% to 100%, 60% to 100%, 70% to 100%, 80% to 100%, 90% to 100%, 95% to 100% or about 100%. In summary, the unmodified ionomers may be neutralized to any level that does not result in an intractable (not melt processible) polymer, or a material that does not have useful physical properties. Suitable counterions for the ionomers are as described above with respect to the thermoplastic composition described herein.

Some preferred ionomer compositions are modified with one or more organic acids or with one or more salts of organic acids. Suitable organic acids include, without limitation, monofunctional organic acids having fewer than 36 carbon atoms, optionally substituted with from one to three substituents independently selected from $C_1$ to $C_8$ alkyl groups. The organic acids may be saturated or unsaturated, and, if unsaturated, may include more than one carbon-carbon double bond. The term "mono-functional" refers to acids with one carboxylic acid moiety. The suitable organic acids include $C_4$ to $C_{36}$ (for example $C_{18}$), more particularly $C_6$ to $C_{26}$, and even more particularly $C_6$ or $C_{12}$ or $C_{18}$ to $C_{22}$ acids. In some cases, $C_{19}$ to $C_{36}$ acids are preferred.

Specific examples of suitable organic acids include, but are not limited to, caproic acid, caprylic acid, capric acid, lauric acid, stearic acid, isostearic acid, behenic acid, erucic acid, oleic acid, iso-oleic acid, and linoleic acid. Naturally derived organic fatty acids such as palmitic, stearic, oleic, erucic, behenic acids, and mixtures thereof may also be employed.

As is well known in the art, commercial grades of organic acids may include a number of structurally different organic acids of varying lesser amounts. As used herein, unless otherwise specified in limited circumstances, a composition that comprises a named acid may also include other acids that are present in commercial grades of the named acid, at levels that are proportional to their levels in the commercial grade. Furthermore, when the transitional term "consisting essentially of" is applied to compositions that comprise a named acid, other acids that are present in commercial grades of the named acid, at levels that are proportional to their levels in the commercial grade, are not excluded from the composition.

Suitable E/X/Y copolymers for use in ionomer compositions that are modified with organic acids are as described immediately above. Suitable neutralization levels for these modified ionomer compositions are from 0 to 100%, preferably 50% to 100%, 50% to 100%, 60% to 100%, 70% to 100%, 80% to 100%, 90% to 100%, 95% to 100% or about 100%. In summary, the modified ionomers may be neutralized to any level that does not result in an intractable (not melt processible) polymer, or a material that does not have useful physical properties. Suitable counterions for these modified ionomers are as described above with respect to the thermoplastic composition described herein.

Preferred modified ionomer compositions include the ionomer compositions described in U.S. patent application Ser. Nos. 11/789,831, filed on Apr. 25, 2007; 11/201,893, filed on Aug. 11, 2005; and 09/422,142, filed on Oct. 21, 1999; and in U.S. Pat. Nos. 6,953,820 6,653,382; and 6,777, 472. Other preferred modified ionomer compositions are described in U.S. Provisional Appln. No. 61/001,454, filed on Nov. 1, 2007; in U.S. Pat. Nos. 6,100,321; 6,815,480; and 7,375,151; and in U.S. Patent Appln. Publn. Nos. 2003/0050373 and 2003/0114565.

Finally, the ionomer compositions may further comprise one or more fillers, blowing agents, or other additives as described above with respect to the thermoplastic compositions.

Golf Ball Construction

The thermoplastic compositions described herein may be used in golf balls that have any type of construction. Golf balls typically comprise concentric layers of materials in their construction and may be divided into two general classes: wound and solid. Wound golf balls typically include a solid, hollow, or fluid-filled center, surrounded by windings of a tensioned elastomeric thread-like material, and a cover. Since early wound balls had three parts (center, windings and cover), wound balls also may be referred to as "three-piece" balls, even if the cover and/or center comprise more than one layer. Solid golf balls include one-piece, two-piece (i.e., solid core and a cover), and multilayer (i.e., a core of one or more layers, one or more intermediate layers and/or a cover of one or more layers) golf balls. As used herein, the term "solid golf ball" also includes a ball comprising a hollow or fluid-filled center surrounded by one or more of solid layers.

The golf ball can have an overall diameter of any size. Although the United States Golf Association ("USGA") specifications limit the minimum size of a competition golf ball to 1.680 inches, there is no specification as to the maximum diameter. Golf balls of any size, however, may be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches; however, diameters anywhere in the range of from 1.7 to about 1.95 inches can be used. Preferably, the overall diameter of the core and all intermediate layers is about 80 percent to about 98 percent of the overall diameter of the finished ball.

Golf balls of any structure in which at least one layer or component of the golf ball comprises the thermoplastic composition described herein are contemplated. For example, the thermoplastic composition may be used in cores or centers of one-piece, two-piece, wound, and multilayer golf ball designs, including golf balls having double cores (a core comprising two parts or layers such as an inner core and an outer core), intermediate layer(s), and/or double covers (a cover comprising two parts or layers such as an inner cover and an outer cover). As known to those of ordinary skill in the art, the type of golf ball constructed, i.e., double core, double cover, and the like, depends on the type or level of performance desired of the ball.

As used herein, the term "layer" includes any substantially spherical or spherically symmetrical portion of a golf ball, i.e., a golf ball core or center, an intermediate layer, and/or a golf ball cover. As used herein, the term "inner layer" refers to any golf ball layer beneath the outermost structural layer of the golf ball. As used herein, the terms "layer" and "structural layer" include a cover, but do not include a coating layer, top coat, paint layer, or the like. As used herein, the term "multilayer", when used without specifying a number of layers, refers to a golf ball with at least three structural layers comprising a cover, an intermediate layer and core. The term "component" refers to any constituent part of a golf ball. A component may have any shape.

Golf balls generally have surface contouring to affect their aerodynamic performance. This surface contouring is typically embodied by a plurality of small, shallow depressions ("dimples") molded into the otherwise spherical surface of the golf ball. The use of various dimple patterns and profiles provides a relatively effective way to modify the aerodynamic characteristics of a golf ball. The dimples can be arranged in any one of a number of patterns to modify the flight characteristics of the balls. For example, the surface contouring of the golf ball may be a conventional dimple pattern such as described in U.S. Pat. No. 6,213,898. For instance, the ball may have an icosahedron-based pattern, such as described in U.S. Pat. No. 4,560,168, or an octahedral-based dimple patterns as described in U.S. Pat. No. 4,960,281.

One golf ball has an icosahedron dimple pattern that includes 20 triangles made from about 362 dimples and, except perhaps for the mold parting line, does not have a great circle that does not intersect any dimples. Each of the large triangles, preferably, has an odd number of dimples (7) along each side and the small triangles have an even number of dimples (4) along each side. To properly pack the dimples, the large triangle has nine more dimples than the small triangle. Another golf ball has five different sizes of dimples in total. The sides of the large triangle have four different sizes of dimples and the small triangles have two different sizes of dimples.

Another golf ball has an icosahedron dimple pattern with a large triangle including three different dimples and the small triangles having only one diameter of dimple. In a preferred golf ball, there are 392 dimples and one great circle that does not intersect any dimples. In another golf ball, more than five alternative dimple diameters are used.

In another golf ball, an octahedron dimple pattern includes eight triangles made from about 440 dimples and three great circles that do not intersect any dimples. In the octahedron pattern, the pattern includes a third set of dimples formed in a smallest triangle inside of and adjacent to the small triangle. To properly pack the dimples, the large triangle has nine more dimples than the small triangle and the small triangle has nine more dimples than the smallest triangle. This golf ball has six different dimple diameters distributed over the surface of the ball. The large triangle has five different dimple diameters, the small triangle has three different dimple diameters and the smallest triangle has two different dimple diameters.

Alternatively, the dimple pattern can be arranged according to phyllotactic patterns, such as described in U.S. Pat. No. 6,338,684. Dimple patterns may also be based on Archimedean patterns including a truncated octahedron, a great rhombicuboctahedron, a truncated dodecahedron, and a great rhombicosidodecahedron, wherein the pattern has a non-linear parting line, as described in U.S. patent application Ser. No. 10/078,417. Another dimple pattern, consisting of a plurality of dimples of various sizes for providing an optimum impact at the moment of hitting the golf ball, is described in US Patent Application Publication 2006/0276267. The golf balls may also be covered with non-circular shaped dimples, i.e., amorphous shaped dimples, as described in U.S. Pat. No. 6,409,615.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. Some of these golf balls have a dimple coverage of the surface area of the cover of at least about 60 percent, preferably at least about 65 percent, and more preferably at least 70 percent or greater. Dimple patterns having even higher dimple coverage values may also be used. Thus, the golf balls may have a dimple coverage of at least about 75 percent or greater, about 80 percent or greater, or even about 85 percent or greater.

Alternatively, the surface contouring of the golf ball may have a non-dimple pattern such as a tubular lattice pattern, such as the one described in U.S. Pat. No. 6,290,615. The golf balls may also have a plurality of pyramidal projections disposed on the intermediate layer of the ball, as described in U.S. Pat. No. 6,383,092. The plurality of pyramidal projections on the golf ball may cover between about 20 percent to about 80 of the surface of the intermediate layer.

In an alternative configuration, the golf ball may have a non-planar parting line allowing for some of the plurality of pyramidal projections to be disposed about the equator. Such a golf ball may be fabricated using a mold as described in U.S. patent application Ser. No. 09/442,845. This configuration allows for greater uniformity of the pyramidal projections.

Several additional non-limiting examples of dimple patterns with varying sizes of dimples are also provided in U.S. patent application Ser. No. 09/404,164 and U.S. Pat. No. 6,213,898.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one golf ball, the dimple count is about 380 dimples or greater, but more preferably is about 400 dimples or greater, and even more preferably is about 420 dimples or greater. In one golf ball, the dimple count is about 422 dimples. In some cases, it may be desirable to have fewer dimples on the ball. Thus, one golf ball has a dimple count of about 380 dimples or less, and more preferably is about 350 dimples or less.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as described in U.S. patent application Ser. No. 09/989,191 are contemplated for use with the golf balls of the invention.

Any surface contouring or dimple pattern is contemplated for use in the golf balls described herein, which are not limited to the dimple patterns and surface contouring described in the references cited above.

Preferred One-Piece Golf Balls

Preferred one-piece golf balls are made by injection or compression molding a sphere of desired size from the thermoplastic composition described above or its blends with other ionomer compositions or with non-ionomeric thermoplastic resins. The ionomer compositions and other resins may be modified or unmodified, and may include conventional additives as described above with respect to the thermoplastic compositions. The one-piece ball may include sufficient filler to provide a golf ball having a desired weight or density. Preferably, enough filler is used so that the ball has a density 1.14 gm/cc or a weight of 45 grams. One-piece golf balls may be coated, lacquered, or otherwise finished as described below with respect to covers.

Preferred Two-Piece Golf Balls

Two-piece balls include a core or center and a cover. They may be manufactured by well-known techniques wherein covers are injection or compression molded over cores. The core of a two-piece ball may be made by injection or compression molding a solid of desired size and shape. Preferred core shapes are substantially spherical or spherically symmetrical.

The core and the cover are prepared from a thermoplastic composition, for example the thermoplastic composition described herein, or from a thermoset composition. The compositions of the core and the cover may be the same or different. The core and cover compositions are optionally filled with sufficient filler to provide a desired density. Suitable core densities can be, for example, from about 1.14 g/cc to about 1.2 g/cc, depending on the diameter of the core and the thickness and composition of the cover. It may be desirable, for example, to produce a golf ball meeting the weight limit (45 grams or less) and size limit set by the USGA. The amount of filler in the cover may be the same as or different from the amount of filler in the core. Likewise, the density of the cover may be the same as or different from the density of the core.

In particular, the innermost layer of the golf ball is known as the center or core. The core may be solid, semi-solid, hollow, filled with a fluid, such as a gas or liquid, powder-filled, or it may comprise a metal, e.g. a metal layer. It may be a one-piece or multi-component core. The term "semi-solid" as used herein refers to a paste, a gel, or a material of similar viscosity or rheology.

A solid core is prepared from a composition that is typically injection-molded or compression-molded to form a substantially spherical or spherically symmetrical solid. Cores may be spherical or they may have a more complex shape (for example, comprising a central portion and a plurality of projections and/or depressions). Spherically symmetrical shapes are preferred, however. For example but not limitation, cores with complex shapes are described in U.S. Patent Application Publication 2004/0209705. The core may be surface treated by plasma treatment, corona discharge, chemical treatment or mechanically treated, for example to improve adhesion to the adjacent layer, cover or mantle.

Any core material known to one of ordinary skill in the art is suitable for use in the golf balls described herein. Suitable core materials include thermoset materials, such as rubber, styrene butadiene, polybutadiene, isoprene, polyisoprene, trans-isoprene, as well as thermoplastic materials such as ionomer resins, ionomer compositions, polyamides or polyesters, and thermoplastic and thermoset polyurethane or polyurea elastomers. Alternatively, the core can be prepared from the thermoplastic compositions described herein.

Conventional thermoset core materials may include a base rubber, a crosslinking agent, a filler, and a co-crosslinking initiator agent. The base rubber typically includes natural or synthetic rubbers. An example of a base rubber is 1,4-polybutadiene having a cis-structure of at least 40%. Preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core. The crosslinking agent may include a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent may be present in an amount from about 15 to about 30 parts per hundred of the rubber, preferably in an amount from about 19 to about 25 parts per hundred of the rubber and most preferably having about 20 to 24 parts crosslinking agent per hundred of rubber. The core compositions may also include at least one organic or inorganic cis-trans catalyst to convert a portion of the cis-isomer of polybutadiene to the trans-isomer, as desired. The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy)diisopropylbenzene, 2,5-dimethyl-2,5 di-(t-butylperoxy)hexane or di-t-butyl peroxide and mixtures thereof.

Preferred thermoplastic cores comprise or are prepared from one or more ionomer compositions. Preferably, these ionomer core compositions are modified E/X/Y copolymers in which the amount of X is 2 to 25 wt %, preferably 5 to 15 wt %, and the amount of Y is 2 to 50 wt %, preferably 5 to 40 wt %. Preferably, the softening monomer, Y, is an alkyl ester of (meth) acrylic acid, and more preferably an alkyl ester of acrylic acid. The melt index of the parent acid copolymer is preferably in the range of 20 to 500 g/10 min, measured at 190° C. using a 2160 g weight. About 50 to 100% of the carboxylic acid moieties in the parent acid copolymers are neutralized. Preferred counterions include sodium, zinc, magnesium, and calcium. The melt index of the ionomer is preferably about 0.1 to 5 g/10 min, measured at 190° C. using a 2160 g weight.

To form the ionomer core compositions, these ionomers are modified with one or more organic acids or with one or more salts of organic acids. Preferred organic acids include caproic acid, caprylic acid, capric acid, lauric acid, stearic acid, isostearic acid, behenic acid, erucic acid, oleic acid, iso-oleic acid. The modifier(s) are present in an amount of about 5 to 50 wt % or about 10 to 50 wt %, based on the total weight of the ionomer core composition. Preferred counterions and preferred neutralization levels are as set forth above with respect to ionomer compositions. Magnesium is more preferred, however, and more preferably at least about 80% to 100% of the acid moieties of the E/X/Y copolymer and of the organic acid are neutralized.

The core has an average diameter such that the thickness of the cover and any additional layers can be added to the diameter of the core to provide a golf ball of desired size, for example, at least about 1.68 inches in diameter.

In particular, the core may have a diameter ranging from about 0.09 inches to about 1.65 inches. In one golf ball, the diameter of the core is about 1.2 inches to about 1.630 inches. In another golf ball, the diameter of the core is about 1.3 inches to about 1.6 inches, preferably from about 1.39 inches to about 1.6 inches, and more preferably from about 1.5 inches to about 1.6 inches. In yet another golf ball, the core has a diameter of about 1.55 inches to about 1.65 inches.

The core of the golf ball may be extremely large in relation to the rest of the ball. For example, in one golf ball, the core makes up about 90% to about 98% of the volume of the ball, preferably about 94% to about 96% of the volume. In this golf ball, the diameter of the core may be preferably about 1.54 inches or greater, preferably about 1.55 inches or greater. In another golf ball, the core diameter is about 1.59 inches or greater. In yet another golf ball, the diameter of the core is about 1.64 inches or less.

The outermost structural layer of a golf ball is known as the cover. The cover provides the interface between the ball and a club. Properties that are desirable for the cover are good moldability, high abrasion resistance, high tear strength, high resilience, and good mold release, among others.

The covers can be made by any suitable method, including, without limitation, casting, injection molding, reaction injection molding, or compression molding a cover composition. One skilled in the art appreciates that the molding method used may be determined at least partially by the properties of the composition. For example, casting may be preferred when the material is thermoset, whereas compression molding or injection molding may be preferred for thermoplastic compositions.

Covers can be made from any conventional golf ball cover material such as ionomer resins, ionomer compositions, balata rubber, thermoset/thermoplastic polyurethanes and the like. Covers may also be prepared from the thermoplastic compositions described herein, or from blends of two or more suitable materials.

Prepolymers used for polyurethanes for covers are produced by combining at least one polyol, such as a polyether, polycaprolactone, polycarbonate or a polyester, and at least one isocyanate. Thermoset polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives may be important because some urethane elastomers that are cured with a diol and/or blends of diols do not produce urethane elastomers with the impact resistance desired in a golf ball cover. Blending the polyamine curatives with diol-cured urethane elastomeric formulations may provide thermoset urethanes with improved impact and cut resistance.

The cover typically has a thickness that is adequate to provide sufficient strength, good performance characteristics, and durability. For example, cover layers may be from about 0.005 inch to about 0.35 inch in thickness. In one golf ball, the cover thickness is from about 0.02 inches to about 0.35 inches. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one golf ball, the outer cover has a thickness from about 0.02 inches to about 0.07 inches. In another golf ball, the cover thickness is about 0.05 inches or less, preferably from about 0.02 inches to about 0.05 inches. In yet another golf ball, the outer cover layer of such a golf ball has a thickness between about 0.02 inches and about 0.045 inches. In still another golf ball, the outer cover layer is about 0.025 to about 0.04 inches thick. In one golf ball, the outer cover layer is about 0.03 inches thick.

As is noted above, the cover of a golf ball, or the surface of a one-piece ball, may be painted, coated, or surface treated for further benefits. For example, the golf ball may be coated with a urethane lacquer or otherwise finished for appearance purposes; however, such a coating, painting and/or finishing generally does not have a significant effect on the performance characteristics of the ball.

The conventional technique for highlighting whiteness is to form a cover toned white with titanium dioxide, subjecting the cover to such surface treatment as corona treatment, plasma treatment, UV treatment, flame treatment, or electron beam treatment, and applying one or more layers of clear paint, which may contain a fluorescent whitening agent.

For example, golf balls covers frequently contain a fluorescent material and/or a dye or pigment to achieve the desired color characteristics. A golf ball may also be treated with a base resin paint composition, however, as described in U.S. Patent Publication No. 2002/0082358, which includes a 7-triazinylamino-3-phenylcoumarin derivative as the fluorescent whitening agent to provide improved weather resistance and brightness.

In addition, trademarks or other indicia may be stamped, i.e., pad-printed, on the outer surface of the ball cover, and the stamped outer surface is then treated with at least one clear coat to give the ball a glossy finish and protect the indicia stamped on the cover.

The golf balls may also be subjected to dye sublimation, wherein at least one golf ball component is subjected to at least one sublimating ink that migrates at a depth into the outer surface and forms an indicia. The sublimating ink may includes at least one of an azo dye, a nitroarylamine dye, or an anthraquinone dye as described in U.S. patent application Ser. No. 10/012,538.

Laser marking of a selected surface portion of a golf ball causing the laser light-irradiated portion to change color is also contemplated for use. U.S. Pat. Nos. 5,248,878 and 6,075,223 generally disclose such methods. In addition, the golf balls may be subjected to ablation, i.e., directing a beam of laser radiation onto a portion of the cover, irradiating the cover portion, wherein the irradiated cover portion is ablated to form a detectable mark, wherein no significant discoloration of the cover portion results therefrom. Ablation is discussed in U.S. patent application Ser. No. 09/739,469.

Protective and decorative coating materials, as well as methods of applying such materials to the surface of a golf ball cover are well known in the golf ball art. Generally, such coating materials comprise urethanes, urethane hybrids, epoxies, polyesters and acrylics. If desired, more than one coating layer can be used. The coating layer(s) may be applied by any suitable method known to those of ordinary skill in the art. In one golf ball, the coating layer(s) is applied to the golf ball cover by an in-mold coating process, such as described in U.S. Pat. No. 5,849,168. In another method, the golf balls produced may undergo various further processing steps after molding, such as buffing, painting and marking as described in U.S. Pat. No. 4,911,451.

Of note is a two-piece golf ball comprising a cover that comprises or is prepared from the thermoplastic composition described herein and a thermoset rubber core. Also of note is a two-piece golf ball comprising a cover that comprises or is prepared from the thermoplastic composition described herein and a thermoplastic core. Further of note is a two-piece ball in which the core comprises or is prepared from the thermoplastic composition described herein.

Preferred Wound Golf Balls

Wound balls are manufactured by well known techniques as described in, e.g., U.S. Pat. No. 4,846,910. The center of wound balls is made by injection or compression molding a solid (optionally semi-solid, hollow, fluid-filled, or powder-filled) of desired size and shape that is optionally filled with sufficient filler to provide a desired center density depending on the diameter of the center, the windings, and the thickness and composition of the cover. For example, it may be desirable to produce a golf ball meeting the weight limits (45 grams) or size limits set by the PGA. The size and shape of the center is such that it can be wound with elastomeric material. The windings may be any elastomeric material conventionally used in wound golf balls and are wound around the center. Covers are then injection or compression molded over the windings. The center or cover of a wound ball may comprise or be prepared from a thermoplastic composition, for example an ionomer composition or the thermoplastic composition described herein, or from a thermoset composition. Suitable covers and centers are as described above with respect to two-piece golf balls.

In one golf ball, the tensioned elastomeric material incorporates a polybutadiene reaction product discussed above. The tensioned elastomeric material may also be formed conventional polyisoprene. In another golf ball, a polyurea composition may be used to form the tensioned elastomeric material. In another golf ball, solvent spun polyether urea, as described in U.S. Pat. No. 6,149,535, may be used to form the tensioned elastomeric material. This material may be useful in achieving a smaller cross-sectional area with multiple strands.

In one golf ball, the tensioned elastomeric layer is a high tensile filament having a tensile modulus of about 10,000 kpsi or greater, as described in U.S. patent application Ser. No. 09/842,829. In another golf ball, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in U.S. patent application Ser. No. 09/841,910.

Of note is a wound golf ball comprising a cover that comprises or is prepared from the thermoplastic composition described herein and a thermoset rubber core.

Preferred Multilayer Golf Balls

Multilayer golf balls contain one or more additional layers between the cover and the core or center. These additional layers are also known as mantles or intermediate layers. Suitable covers and centers for multilayer balls are as described above with respect to two-piece golf balls.

Multilayer balls may be manufactured by well-known techniques wherein an injection or compression molded core is covered by one or more intermediate layers or mantles and a cover. The various layers of the golf balls are made by injection or compression molding a sphere or layer of desired size or thickness. Any of the cover, the core, or the intermediate layer(s) may comprise or be prepared from a thermoplastic composition, for example the thermoplastic composition described herein. Alternatively, any of the structural layers may comprise or be prepared from a thermoset composition.

In addition, any of the golf ball components may optionally include sufficient filler to provide a golf ball having a desired density, for example one that meets the size and weight limits set by the USGA. Accordingly, the amount of filler employed in the core and/or mantle(s) can be varied from 0 to about 60 weight % depending on the size (thickness) of the components and the desired distribution of the weight in the ball. Preferably, enough filler is used so that the ball has an overall density of about 1.14 gm/cc. The filler can be used in the core and not in the mantle, in the mantle and not in the core, or in both.

An intermediate layer may also be referred to as an "inner cover" or an "outer core" or a "boundary layer." These intermediate layers may form a substantially spherical or spherically symmetrical shell around the core. For example, intermediate layers may have a plurality of projections and/or depressions that are complementary to any projections and/or depressions in the other layers of the golf ball, such as in the outer surface of the core and/or the inner face of the cover. "Mantle" or "boundary layer" may refer to a relatively thin layer, for example, a layer that is from about 0.20 inch to about 0.075 inch in thickness, and that is in contact with the inner surface of the cover layer.

The intermediate layer may comprise or be prepared from ionomer resins, ionomer compositions, the thermoplastic compositions described herein, or non-ionomeric compositions including, but not limited to, polyvinyl chloride, copolymers of vinyl chloride with vinyl acetate, acrylic esters or vinylidene chloride, polyolefins, such as polyethylene, polypropylene, polybutylene copolymers and homopolymers produced using a single-site catalyst or a metallocene catalyst, polyphenylene ether, copolymers such as ethylene methylacrylate, ethylene ethylacrylate, ethylene vinyl acetate, ethylene methacrylic acid, ethylene acrylic acid, propylene acrylic acid, polyamides such as poly(hexamethylene adipamide) and others prepared from diamines and dibasic acids, as well as those from amino acids such as poly(caprolactam).

Other suitable materials include but are not limited to, thermoplastic or thermosetting polyurethanes, thermoplastic block polyesters, for example, a polyester elastomer such as that marketed by DuPont under the trademark HYTREL®, or thermoplastic block polyamides, for example, a polyether amide such as that marketed by Elf Atochem S. A. under the trade name PEBAX, a blend of two or more non-ionomeric thermoplastic elastomers, or a blend of one or more ionomers and one or more non-ionomeric thermoplastic elastomers. Moreover, mixtures of two or more of any of the suitable materials described above, including polyamide/ionomer blends, polyphenylene ether/ionomer blends, etc., may also be used in the intermediate layer.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are described in U.S. patent application Ser. No. 10/028,826. In one golf ball, the interstitial material may extend from the intermediate layer into the core. In an alternative golf ball, the interstitial material can also be embedded in the cover, or be in contact with the inner surface of the cover, or be embedded only in the cover.

At least one intermediate layer may also be a moisture barrier layer, such as the ones described in U.S. Pat. No. 5,820,488. The moisture barrier layer may be any suitable film-forming material having a lower water vapor transmission rate than the other layers between the core and the outer surface of the ball, i.e., cover, primer, and clear coat. In one golf ball, the moisture barrier layer has a moisture or water vapor transmission rate (WVTR or MVTR) that is sufficiently low to reduce the loss of COR of the golf ball by at least 5 percent if the ball is stored at 100° F. and 70 percent relative humidity for six weeks as compared to the loss in COR of a golf ball that does not include the moisture barrier, has the same type of core and cover, and is stored under substantially identical conditions. For example, the material for the moisture barrier layer may have MVTR of less than 100 (mil·gm)/(m$^2$·day) when measured according to ASTM F1249 at 100% RH and around 38° C.

Alternatively, the moisture barrier layer may be prepared from a material having a weight gain of less than 2.0%, preferably less than or equal to 1.6% weight gain, more preferably less than or equal to 1.3% weight gain, more preferably less than or equal to 1.2% weight gain, more preferably less than or equal to 1.0% weight gain, more preferably less than or equal to 0.8% weight gain, and most preferably less than or equal to 0.55% weight gain, after exposure to an atmosphere of 50% relative humidity (RH) for 90 days at room temperature (about 20-25° C.).

Other suitable materials for use in moisture vapor barrier layers include the ionomer compositions described in U.S. patent application Ser. Nos. 11/789,831, filed on Apr. 25, 2007; 11/201,893, filed on Aug. 11, 2005; and 09/422,142, filed on Oct. 21, 1999; and in U.S. Pat. Nos. 6,953,820 6,653,382; and 6,777,472.

When the intermediate layer comprises or is prepared from an ionomer composition, the ionomer may include so-called "low acid" or "high acid" ionomers, as well as blends of low acid and high acid ionomers. In general, ionomers prepared by neutralizing acid copolymers including up to about 15 percent acid are considered low acid ionomers, while those including greater than about 15 percent acid are considered high acid ionomers.

A low acid ionomer is believed to impart high spin. Thus, in one golf ball, the intermediate layer includes a low acid ionomer in which the acid is present in about 10 to 15 weight percent and which optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another golf ball, the intermediate layer includes at least one high acid ionomer, for low spin rate and maximum distance. In this ionomer, the acrylic or methacrylic acid is present in about 15 to about 35 weight percent, and the ionomer has a high modulus. In one golf ball, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl alkyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus ionomers include, but are not limited to, high acid ethylene/acrylic acid copolymers, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Preferred for use in intermediate layers are ionomer compositions and their blends with other materials that are suitable for use in intermediate layers. Particularly preferred for use in intermediate layers are the thermoplastic compositions described herein, and their blends with other materials that are suitable for use in intermediate layers.

Turning now to the structure of the multilayer golf ball, the range of thicknesses for the intermediate layer is large because of the vastly different constructions that are possible, i.e., an outer core layer, an inner cover layer, a wound layer, a moisture/vapor barrier layer, and the like. In general, however, suitable intermediate layers, or inner cover layers, may have a thickness of about 0.3 inches or less. In one golf ball, the thickness of the intermediate layer is from about 0.002 inches to about 0.1 inches, preferably about 0.01 inches or greater. In one golf ball, the thickness of the intermediate layer is about 0.09 inches or less, preferably about 0.06 inches or less. In another golf ball, the intermediate layer's thickness is about 0.05 inches or less, more preferably about 0.01 inches to about 0.045 inches. In one golf ball, the intermediate layer's thickness is about 0.02 inches to about 0.04 inches. In another golf ball, the intermediate layer's thickness is from about 0.025 inches to about 0.035 inches. In yet another golf ball, the thickness of the intermediate layer is about 0.035 inches thick. In still another golf ball, the inner cover layer is from about 0.03 inches to about 0.035 inches thick. Varying combinations of these ranges of thickness for the intermediate and outer cover layers may be used in combination with other golf balls described herein.

The ratio of the thickness of the intermediate layer to the outer cover layer is preferably about 10 or less, preferably from about 3 or less. In another golf ball, the ratio of the thickness of the intermediate layer to that of the outer cover layer is about 1 or less. The core and intermediate layer(s) together may be considered to form an "inner ball" preferably having a diameter of about 1.48 inches or greater for a golf ball having a diameter of 1.68 inch. In one 1.68-inch golf ball, the inner ball has a diameter of about 1.52 inches or greater. In another 1.68-inch golf ball, the inner ball has a diameter of about 1.66 inches or less. In one golf ball whose diameter is greater than or equal to 1.72 inch, the inner ball diameter is about 1.50 inches or greater. In another 1.72-inch golf ball, the diameter of the inner ball is about 1.70 inches or less.

Finally, in multilayer balls, the core itself may have more than one layer. When the core includes an inner core layer and an outer core layer, the inner core layer may be preferably about 0.9 inches or greater in thickness and the outer core layer preferably has a thickness of about 0.1 inches or greater. In one golf ball, the inner core layer has a diameter from about 0.09 inches to about 1.2 inches and the outer core layer has a thickness from about 0.1 inches to about 0.8 inches. In yet another golf ball, the inner core layer diameter is from about 0.095 inches to about 1.1 inches and the outer core layer has a thickness of about 0.20 inches to about 0.03 inches.

Preferred multilayer golf balls and golf balls of note include, without limitation, those set forth in the following Table.

TABLE

Preferred Multilayer Golf Balls

| Golf Ball | Core | Mantle(s)[1] | Cover |
|---|---|---|---|
| ML1 | TPC[2] | Any suitable[3] | Any suitable |
| ML2 | Any suitable | TPC | Any suitable |
| ML3 | Any suitable | Any suitable | TPC |
| ML4 | TPC | Any suitable | Ionomer Comp.[4] |
| ML5 | Any suitable | TPC | Ionomer Comp. |
| ML6 | TPC | Any suitable | Polyurethane[5] |
| ML7 | Any suitable | TPC | Polyurethane |
| ML7 | Thermoset | Any suitable | TPC |
| ML8 | Thermoset | TPC | Any suitable |
| ML9 | Ionomer Comp. | TPC | Ionomer Comp. |
| ML10 | Ionomer Comp. | TPC | Polyurethane |

Notes for Table:
[1]When the multilayer golf ball has more than one mantle, only one of the mantles need include the component listed in the Table. The materials for the other intermediate layer(s) are selected independently from the suitable materials described herein. In addition, the composition of each mantle may be the same as or different from the composition(s) of the other mantle(s).
[2]"TPC" is an abbreviation for "the thermoplastic composition described herein".
[3]"Any suitable" means that the material for this component may be selected independently from the suitable materials described herein for use in the specified golf ball component.
[4]"Ionomer Comp." refers to the ionomer compositions described herein.
[5]The term "polyurethane" refers to thermoset or thermoplastic polyurethanes.

Selection of Materials for Performance Criteria

The properties such as hardness, modulus, compression resilience, core diameter, intermediate layer thickness and cover layer thickness of the golf balls have been found to affect play characteristics such as spin, initial velocity and feel of the present golf balls. For example, the flexural and/or tensile modulus of the intermediate layer are believed to have an effect on the "feel" of the golf balls.

The terms "compression" or "PGA Compression" used in the golf ball trade generally define the overall resistance to deflection that a golf ball undergoes when subjected to a compressive load. For example, compression indicates the amount of resistance to change in golf ball's shape upon striking. PGA compression is typically based on a unitless scale of from 0 to 200. The lower the PGA compression value, the softer the feel of the ball upon striking.

In order to assist in the determination of compression, several devices have been employed by the industry. For example, PGA compression is determined by an apparatus fashioned in the form of a small press.

PGA compression can be determined by utilizing a golf ball compression tester produced by OK Automation, Sinking Spring, Pa. (formerly, Atti Engineering Corporation of Newark, N.J.). This machine, equipped with a Federal Dial Gauge, Model D81-C, employs a calibrated spring under a known load. The unitless value obtained by this tester typically ranges from 0 to 200. Compression measured with this instrument may be referred to as "Atti compression" and corresponds to "PGA compression." The golf balls described herein may have an Atti compression of at least about 40, or from about 50 to 120, or from about 60 to 100.

Alternative devices have also been employed to determine compression. For example, a modified Riehle Compression Machine originally produced by Riehle Bros. Testing Machine Company, Philadelphia, Pa., can be used to evaluate compression of the various components (i.e., cores, mantles, covers, finished balls, etc.) of the golf balls. The Riehle compression device determines deformation in thousandths of an inch under a load designed to emulate the 200 pound spring constant of the Atti or PGA compression tester. Atti or PGA compression may be approximately related to Riehle compression through the following equation:

Atti or PGA compression=(160−Riehle Compression).

Thus, a Riehle compression of 100 would be the same as an Atti compression of 60.

Furthermore, additional compression devices may also be utilized to monitor golf ball compression. These devices have been designed, such as a Whitney Tester, Whitney Systems, Inc., Chelmsford, Mass., or an Instron Device, Instron Corporation, Canton, Mass., to correlate or correspond to PGA or Atti compression through a set relationship or formula. Compression measured using an INSTRON Device (model 5544). Compression of a golf ball, core, or golf ball component is measured to be the deflection (in inches) caused by a 200 pound load applied in a Load Control Mode at the rate of 15 kips, an approach speed of 20 inches per minute, with a preload of 0.2 lbf plus the system compliance of the device. Compression values determined using an INSTRON device may range from about 0.1 to about 0.2.

Hardness

Most golf balls consist of layers having different hardnesses, e.g., hardness gradients, to achieve desired performance characteristics. Golf balls having hardness gradients between layers, as well as those golf balls with layers having the same hardness are contemplated.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat plaque formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

The golf ball cores, including cores that comprise or are prepared from the thermoplastic composition described herein, may have varying hardnesses depending on the particular golf ball construction. In one golf ball, the core hardness is at least about 15 Shore A, preferably about 30 Shore A, as measured on a formed sphere. In another golf ball, the core has a hardness of about 50 Shore A to about 90 Shore D. In yet another golf ball, the hardness of the core is about 80 Shore D or less. Preferably, the core has a hardness about 30 to about 65 Shore D, and more preferably, the core has a hardness about 35 to about 60 Shore D.

When a polybutadiene reaction product is incorporated into a core, the core may have a hardness gradient, i.e., a first hardness at a first point, i.e., at an interior location, and a second hardness at a second point, i.e., at an exterior surface, as measured on a molded sphere. In one golf ball, the second hardness is at least about 6 percent greater than the first hardness, preferably about 10 percent greater than the first hardness. In other golf balls, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C.

In another golf ball, however, the core has a substantially uniform hardness throughout. Thus, in this aspect, the first and second hardness preferably differ by about 5 percent or less, more preferably about 3 percent or less, and even more preferably by about 2 percent or less. In yet another golf ball, the hardness is uniform throughout the component.

The intermediate layers, including intermediate layers that comprise or are prepared from the thermoplastic compositions described herein, may also vary in hardness depending on the construction and desired characteristics of the golf ball. In one golf ball, the hardness of the intermediate layer is about 30 Shore D or greater. In another golf ball, the hardness of the intermediate layer is about 90 Shore D or less, preferably about 80 Shore D or less, and more preferably about 70 Shore D or less. In yet another golf ball, the hardness of the intermediate layer is about 50 Shore D or greater, preferably about 55 Shore D or greater. In one golf ball, the intermediate layer hardness is from about 55 Shore D to about 65 Shore D. The intermediate layer may also be about 65 Shore D or greater. In golf balls comprising two or more intermediate layers, the hardnesses of the intermediate layers may be the same or different, and may have any value set forth above.

When an intermediate layer is intended to be harder than the core, the ratio of the intermediate layer hardness to the core hardness is preferably about 2 or less. In one golf ball, the ratio is about 1.8 or less. In yet another golf ball, the ratio is about 1.3 or less.

As with the core and intermediate layers, the cover hardness may vary depending on the construction and desired characteristics of the golf ball. Again, this principle also applies to covers that comprise or are prepared from the thermoplastic compositions described herein. The ratio of cover hardness to inner ball hardness is a primary variable used to control the aerodynamics of a ball and, in particular, the spin of a ball. In general, the harder the inner ball, the greater the driver spin, and, conversely, the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the plaque. In another golf ball, the cover itself has a hardness of about 30 Shore D or greater. In particular, the cover may be from about 30 Shore D to about 60 Shore D. In one golf ball, the cover has a hardness of about 40 Shore D to about 65 Shore D. In another golf ball, the cover has a hardness less than about 45 Shore D, preferably less than about 40 Shore D, and more preferably about 25 Shore D to about 40 Shore D. In one golf ball, the cover has a hardness from about 30 Shore D to about 40 Shore D.

In a golf ball in which the outer cover layer is softer than the intermediate layer or inner cover layer, the ratio of the Shore D hardness of the outer cover material to the intermediate layer material may be about 0.8 or less, preferably about 0.75 or less, and more preferably about 0.7 or less. In another golf ball, the ratio is about 0.5 or less, preferably about 0.45 or less.

In yet another golf ball, the ratio may be about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this golf ball, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another golf ball, the cover has a hardness of about 95 Shore C or less, preferably about 90 Shore C or less.

In another golf ball, the cover layer is harder than the intermediate layer. In this design, the ratio of Shore D hardness of the cover layer to the intermediate layer is about 1.33 or less, preferably from about 1.14 or less.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another golf ball, the ratio is about 1.55 or less.

Initial Velocity and COR

The thermoplastic compositions described herein can provide tailored resiliency as indicated by the coefficient of restitution (COR). Coefficient of restitution is measured by firing a sphere that is 1.50 to 1.68 inches in diameter at an initial velocity of 125 feet/second against a steel plate positioned 3 feet from the point where initial velocity is determined and dividing the velocity of rebound from the plate by the initial velocity. COR may be determined on a sphere prepared from a single composition or a sphere having two or more layers (for example, a finished golf ball).

Of note is the thermoplastic composition that when formed into a sphere of 1.50 to 1.68 inches in diameter exhibits a rebound velocity of greater than 94 ft/sec, or greater than 99 ft/sec, when the sphere is fired at an initial velocity of 125 ft/sec against a steel plate positioned 3 feet from the point where initial velocity is determined.

There is currently no USGA limit on the COR of a golf ball, but the initial velocity of a USGA-approved golf ball cannot exceed 250±5 feet/second (ft/s), when measured under standard conditions. Thus, for one golf ball, the initial velocity is about 245 ft/s or greater and about 255 ft/s or greater. For another golf ball, the initial velocity is about 250 ft/s or greater. For one golf ball, the initial velocity is about 253 ft/s to about 254 ft/s. For yet another golf ball, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover.

Similarly, when the cover contributes substantially to high COR of the ball, a lesser contribution is needed from the core.

Examples include a golf ball comprising a core, a cover prepared from an ionomer composition or a polyurethane; and an intermediate layer comprising or prepared from the thermoplastic composition described herein wherein the composition of intermediate layer when formed into a sphere of 1.50 to 1.68 inches in diameter exhibits a rebound velocity of greater than 94 ft/sec, or greater than 99 ft/sec, when the sphere is fired at an initial velocity of 125 ft/sec against a steel plate positioned 3 feet from the point where initial velocity is determined.

The thermoplastic compositions described herein, when formed into such a sphere, may have a coefficient of restitution of greater than about 0.6, preferably greater than about 0.5, more preferably greater than about 0.68, most preferably greater than about 0.7.

These rebound velocities and COR values are for spheres prepared from the thermoplastic composition without filler. Filled compositions may have reduced rebound velocity or COR compared to the unfilled composition, the reduction roughly proportional to the volume % of filler in the composition.

The combination of resilience and compression for a golf ball can be summarized by the "Nes Factor." The Nes factor is determined by taking the sum of the compression measured by an INSTRON device and resilience (COR) measurements and multiplying this value by 1000. It represents an optimal combination of softer but more resilient compositions.

Another measure of resilience is the "loss tangent," or tan Δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the material should be less than about 50,000 N/m at −50° C. For example, the dynamic stiffness should be between about 10,000 and 40,000 N/m at −50° C., or between about 20,000 and 30,000 N/m at −50° C.

Flexural Modulus

It is preferable that the golf balls have an intermediate layer with a flexural modulus of about 500 psi to about 500,000 psi. More preferably, the flexural modulus of the intermediate layer is about 1,000 psi to about 250,000 psi. Most preferably, the flexural modulus of the intermediate layer is about 2,000 psi to about 200,000 psi. The thermoplastic compositions described herein may have flexural modulus greater than 60, 80, 90, 100, 110, or 120 kpsi. Of note is a thermoplastic composition having a flexural modulus of greater than 80 kpsi, or 100 kpsi, measured according to ASTM D-790 B. Accordingly, the thermoplastic compositions described herein are useful for high modulus intermediate layers or cover layers. Examples include a golf ball comprising a core, a cover prepared from an ionomer or a polyurethane; and an intermediate layer comprising or prepared from the thermoplastic composition described herein having a flexural modulus of greater than 80 kpsi, or 100 kpsi, measured according to ASTM D-790 B.

The flexural modulus of the cover layer is preferably about 2,000 psi or greater, and more preferably about 5,000 psi or greater. In one golf ball, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In another golf ball, the flexural modulus of the cover layer is about 100,000 psi or less, preferably about 80,000 or less, and more preferably about 70,000 psi or less. In one golf ball, when the cover layer has a hardness of about 50 Shore D to about 60 Shore D, the cover layer preferably has a flexural modulus of about 55,000 psi to about 65,000 psi.

In one golf ball, the ratio of the flexural modulus of the intermediate layer to the cover layer is about 0.003 to about 50. In another golf ball, the ratio of the flexural modulus of the intermediate layer to the cover layer is about 0.006 to about 4.5. In yet another golf ball, the ratio of the flexural modulus of the intermediate layer to the cover layer is about 0.11 to about 4.5.

In one golf ball, the thermoplastic compositions described herein are used in a golf ball with multiple cover layers having essentially the same hardness, but with differences in their flexural moduli. In this golf ball, the difference between the flexural moduli of the two cover layers is preferably about 5,000 psi or less. In another golf ball, the difference in flexural moduli is about 500 psi or greater. In yet another golf ball, the difference in the flexural moduli between the two cover layers, wherein at least one is reinforced is about 500 psi to about 10,000 psi, preferably from about 500 psi to about 5,000 psi. In one golf ball, the difference in flexural moduli between the two cover layers formed of unreinforced or unmodified materials is about 1,000 psi to about 2,500 psi.

In summary, the selection of compositions with specific resilience, compression, hardness and/or flex modulus will largely depend upon the type of golf ball desired (i.e., one-piece, two-piece, wound, or multilayered), and in the type of performance desired for the resulting golf ball as detailed above.

The following examples are provided to describe the invention in further detail. These examples, which set forth a preferred mode presently contemplated for carrying out the invention, are intended to illustrate and not to limit the invention.

EXAMPLES

Testing Criteria for Examples

Coefficient of Restitution (COR) is measured by firing an injection-molded neat sphere of the resin the size of a golf ball from an air cannon at a velocity determined by the air pressure. The initial velocity generally employed is 125 feet/second. The sphere strikes a steel plate positioned three feet away from the point where initial velocity is determined, and rebounds through a speed-monitoring device located at the same point as the initial velocity measurement. The return velocity divided by the initial velocity is the COR. One can also measure COR at several initial velocities, develop a correlation and determine a COR at a specified initial velocity based on the correlation.

In the Examples below, melt index (MI) refers to melt index as determined according to ASTM D1238 at 190° C. using a 2160 g weight, with values of MI reported in g/10 minutes.

The Shore D hardness of a material is measured generally in accordance with ASTM D-2240, except the measurements are made on the curved surface of a molded sphere, rather than on a plaque. Shore D hardness of multilayer spheres is measured with all layers present. When a hardness measurement is made on a dimpled sphere, Shore D hardness is measured at a land area of the dimpled sphere.

Flex Modulus is measured according to ASTM D-790 B.

Tensile Strength is measured according to ASTM D-638.

Water vapor transmission rate (WVTR or MVTR) was measured on a PERMATRAN-W Model 700 instrument (available from MOCON, Inc., Minneapolis, Minn.) operated according to operating instructions at 38.1° C. and 100% RH.

Impact Durability is the average number of hits to failure of balls fired by an air cannon of a COR tester at 175 or 135 ft/sec which impact a flat metal plate at a perpendicular angle.

Scuff resistance was determined in the following manner: a D-2 tool steel plate machined to simulate a sharp grooved pitching wedge with square (box) grooves was mounted on a swing arm that swings in a horizontal plane. The simulated club face was oriented for a hit on a golf ball at a 54° angle. The machine was operated at a simulated club head speed of 140 feet per second. Balls were prepared as described below from each of the test compositions. Comparison balls with polyurethane covers were obtained commercially. At least three balls of each composition were tested and each ball was hit once. After testing, the balls were rated according to the following criteria (see Table A). A stereo optical inspection microscope (2× to 10×) or equivalent was used to view the balls. Scuff damage was characterized by the presence of indented lines, lifts or groove bands. Indented lines are visible lines created by permanent displacement of the resin, but without cutting, breaking or discontinuity of the surface. Lifts are scuffs in which the resin is displaced enough that the surface is broken such that a portion of the resin is separated from the bulk of the ball. Severe lifts include flaps, whiskers or strands. Groove bands are bands of resin missing from the bulk of the ball corresponding in dimension to a single groove of the club face. The ratings were assigned numerical values based on the criteria in Table A.

TABLE A

| | |
|---|---|
| 0 | No sign of impact or damage |
| 1 | 1 or more indented lines on ball, but no cuts on the surface |
| 1.5 | Cut marks from the clubface are present, but no ridges |
| 2 | 1 or more ridges |
| 3 | 1 or more whiskers |
| 3.5 | Part of a ridge is missing with/without presence of whiskers |
| 4 | 1 or more groove bands of material missing from cover |
| 5 | 1 or more groove bands of material missing and material is sheared down to the bottom surface of dimples. |

Compositions were prepared by melt blending the ionomer resins and the modifier employing a Werner & Pfleiderer twin-screw extruder. After blending, the compositions were extruded into the appropriate shapes for mechanical property testing. The materials were injection molded into flex bars and tensile test pieces and then tested for Shore D hardness, room temperature flex modulus, and room temperature tensile properties after aging for a period of at least two weeks at room temperature. The compositions were molded into spheres of about 1.53 to 1.54 inch diameter, and the spheres were tested for golf ball properties, such as Atti compression, coefficient of restitution (COR), Shore D Hardness, and drop rebound. The compositions were also molded over commercial thermoset rubber cores to afford balls with diameter of about 1.68 inch. The balls were tested for golf ball properties, such as Atti compression, coefficient of restitution (COR), durability and scuff resistance. For accurate comparison of compression data, the diameter of the balls was corrected to 1.68 inch diameter using accepted methods, such as shimming.

Films were prepared by melting the composition in a twin screw extruder, exiting through a coat-hanger shaped sheet die to make a film of about 76 to about 104 micron thickness.

Materials Used

I-1: An ethylene methacrylic acid (MAA) dipolymer with 19 weight % of MM, neutralized by reaction with ZnO, to provide an ionomer with MI of 4.0.

I-2: An ethylene methacrylic acid (MAA) dipolymer with 19 weight % of MM, neutralized by reaction with NaOH, to provide an ionomer with MI of 4.5.

I-3: An ethylene methacrylic acid (MAA) dipolymer with 19 weight % of MAA, neutralized by reaction with $Mg(OH)_2$, to provide an ionomer with MI of 1.1.

I-4: An ethylene methacrylic acid (MAA) dipolymer with 8.7 weight % of MAA, neutralized by reaction with ZnO, to provide an ionomer with MI of 5.2.

I-5: An ethylene methacrylic acid (MAA) dipolymer with 15 weight % of MM, neutralized by reaction with ZnO, to provide an ionomer with MI of 0.7.

I-6: An ethylene methacrylic acid (MAA) dipolymer with 19 weight % of MAA, neutralized by reaction with ZnO, to provide an ionomer with MI of 1.3.

I-7: An ethylene methacrylic acid (MM) dipolymer with 15 weight % of MAA, neutralized by reaction with $Mg(OH)_2$, to provide an ionomer with MI of 1.

I-8: An ethylene methacrylic acid (MAA) dipolymer with 19 weight % of MM, neutralized by reaction with NaOH, to provide an ionomer with MI of 2.6.

I-9: An ethylene methacrylic acid (MAA) terpolymer with 9 weight % of MAA and 23 weight % n-butyl acrylate, neutralized by reaction with $Mg(OH)_2$, to provide an ionomer with MI of 1.0.

I-10: An ethylene methacrylic acid (MAA) dipolymer with 15 weight % of MM with MI of 220, neutralized by reaction with ZnO to provide an ionomer with MI of 4.2.

I-11: An ethylene methacrylic acid (MAA) dipolymer with 19 weight % of MAA with MI of 60, neutralized by reaction with $Mg(OH)_2$ to provide an ionomer with MI of 2.5.

I-12: A blend of an ethylene/n-butyl acrylate/acrylic acid (15.5 weight % of nBA and 8.5 weight % AA) terpolymer with Mg stearate and neutralized by reaction with $Mg(OH)_2$ to nominally 98% total neutralization, MI=1.

I-13: An ethylene methacrylic acid (MM) dipolymer with 15 weight % of MM and MI of 60, neutralized by reaction with Li(OH) to provide an ionomer with MI of 2.6.

I-14: An ethylene methacrylic acid (MM) dipolymer with 15 weight % of MM and MI of 60, neutralized by reaction with Na(OH) to provide an ionomer with MI of 0.9.

I-15: A blend of an ethylene/n-butyl acrylate/acrylic acid (15.5 weight % of nBA and 10.5 weight % AA) terpolymer with 35 weight % oleic acid and neutralized by reaction with $Mg(OH)_2$ to a final MI of 1.

Amine-1: CHIMASSORB 944, available from CIBA.

PVP-1: A polyvinylpyrrolidone, 30,000 Dalton molecular weight, available from International Specialty Products (ISP), Wayne, N.J.

PVP-2: A polyvinylpyrrolidone, 15,000 Dalton molecular weight, available from ISP.

PVP-3: A polyvinylpyrrolidone, 90,000 Dalton molecular weight, available from ISP.

PEO-1: A poly(2-ethyl oxazoline, 50,000 Dalton molecular weight, available from ISP.

AO-1: antioxidant IRGANOX 1010 available from CIBA.

Three samples of each composition were tested. The results are reported as average values in the Tables below. Standard deviations, if reported, appear in parentheses. Comparative Examples using nonmodified ionomers were run with each set of Examples. Some variability in properties for a given composition between tests sets may be expected.

As shown in Tables 1 to 4, addition of a polyamine (Amine-1) to ionomers provides a significant increase in flex modulus and decrease in elongation at break. Addition of Amine-1 has modest, mixed effects on MI. Modification with amines provides increased compression, hardness, and COR, but may have little effect on scuff or durability.

TABLE 1

| | \multicolumn{6}{c}{Example} |
|---|---|---|---|---|---|---|
| | C1 | 1 | 2 | C2 | 3 | 4 |
| I-1 | 100 | 90 | 80 | 0 | | |
| I-4 | 0 | 0 | 0 | 100 | 95 | 90 |
| Amine-1 | 0 | 10 | 20 | 0 | 5 | 10 |
| MI | 4.0 | 4.8 | 4.1 | 5.2 | 3.6 | 4.2 |
| Appearance | clear | white, opaque | white, opaque | | | |
| Spheres | | | | | | |
| Compression as measured | 159 | 164 | 171 | 142 | 154 | 157 |
| Hardness, Shore D | 66 | 71 | 72 | 55.1 | 59.7 | 64.4 |
| COR-125 | 0.717 | 0.767 | 0.794 | 0.513 | 0.577 | 0.668 |
| 2-Piece Balls | | | | | | |
| Compression | 101 | 104 | 109 | 78 | 84 | 88 |
| COR-125 | 0.805 | 0.808 | 0.813 | 0.737 | 0.753 | 0.772 |
| Impact Durability | | | | | | |
| at 135 ft/sec | 112 | 96 | 48 | | | |
| at 175 ft/sec | | | | 6 | 9.2 | 7.6 |
| Scuff testing | 3.2 | 3.3 | 3.9 | 2.8 | 3.1 | 3.0 |
| Film | | | | | | |
| WVTR (mil · g/m² · day) | 20 | 26 | 36 | | | |
| Tensile and Flex Pieces | | | | | | |
| Flex Modulus (kpsi) | 62 | 102 | 125 | 24 (3) | 43 (4) | 62 (4) |
| Stress at Break (kpsi) | 2.57 | 3 | 3.35 | | | |
| Elongation at Break (%) | 104 | 91 | 87 | 225 | 191 | 114 |
| Tensile Strength (kpsi) | 2.67 | 3.43 | 4.28 | 2.10 | 2.42 | 2.34 |
| Hardness, Shore D | | | | 49.2 | 57.9 | 61.0 |

TABLE 2

| | \multicolumn{5}{c}{Example} |
|---|---|---|---|---|---|
| | C1 | 5 | 6 | 7 | 8 |
| I-1 | 100 | 80 | 75 | 70 | 40 |
| I-6 | 0 | 0 | 0 | 0 | 40 |
| Amine-1 | 0 | 20 | 25 | 30 | 20 |
| MI | 4.0 | 3.5 | 4.0 | 5.0 | 1.9 |
| Spheres | | | | | |
| Compression as measured | 168 | 178 | 178 | 183 | 178 |
| Hardness, Shore D | 64 | 71 | 73 | 74 | 72 |
| COR-125 | 0.699 | 0.794 | 0.799 | 0.799 | 0.793 |
| 2-Piece Balls | | | | | |
| Compression | 116 | 123 | 125 | 127 | 125 |
| COR-125 | 0.792 | 0.803 | crack | crack | 0.804 |
| Impact Durability at 135 ft/sec | 89 | 29 | <5 | <5 | 36 |
| Scuff Testing | 3 | 3 | 3 | 3 | 3 |
| Tensile and Flex pieces | | | | | |
| Flex Modulus (kpsi) | 61 | 126 | 144 | 154 | 128 |
| Stress at Break (kpsi) | 3.1 | 4.4 | 3.6 | 1.3 | 4.3 |
| Elongation at Break (%) | 83% | 47% | 4% | 1% | 32% |
| Tensile Strength (kpsi) | 3.1 | 3.6 | 3.6 | 1.3 | 3.7 |

TABLE 3

| | C3 | 9 | 10 | 11 | 12 | 13 | C4 |
|---|---|---|---|---|---|---|---|
| I-1 | | | | 67.5 | 45 | | |
| I-10 | 100 | 90 | 80 | | | | |
| I-11 | | | | 22.5 | 45 | 80 | 100 |
| Amine-1 | | 10 | 20 | 10 | 10 | 20 | |
| MI | 4.2 | 2.8 | 3.5 | 2.5 | 1.8 | 0.5 | 2.5 |
| Spheres | | | | | | | |
| Compression as measured | 164 | 169 | 176 | 177 | 174 | 180 | 172 |
| average hardness, D | 64 | 66 | 68 | 68 | 69 | 72 | 67 |
| COR-125 | 0.668 | 0.748 | 0.758 | 0.769 | 0.770 | 0.799 | 0.770 |
| 2-piece Balls | | | | | | | |
| Compression | 115 | 120 | 119 | 125 | 121 | 122 | 118 |
| COR-125 | 0.787 | 0.791 | 0.794 | 0.798 | 0.798 | 0.805 | 0.796 |
| Impact Durability at 135 fps | 101 | 60 | 48 | 70 | 93 | 48 | 138 |
| Scuff Testing | 3 | 3 | 3 | 3 | 3 | 3 | 3 |
| Tensile And Flex Pieces | | | | | | | |
| Flex Modulus (ksi) | 59 | 81 | 102 | 104 | 105 | 130 | 90 |
| Stress at Break (ksi) | 2.9 | 3.2 | 3.6 | 3.5 | 3.7 | 4.4 | 3.5 |
| Elongation at Break (%) | 96% | 49% | 50% | 68% | 67% | 42% | 91% |
| Tensile Strength (kpsi) | 2.9 | 3.2 | 3.3 | 3.5 | 3.7 | 4.1 | 3.5 |

TABLE 4

| | C5 | 14 | 15 | 16 |
|---|---|---|---|---|
| I-6 | 100 | 98.20 | 96.70 | 95.20 |
| AO-1 | 0 | 0.3 | 0.3 | 0.3 |
| Amine-1 | 0 | 1.5 | 3.0 | 4.5 |
| MI | | 1.2 | 0.98 | 1 |
| Spheres | | | | |
| Specific Gravity, g/cc | | | | |
| COR-125 | | 0.677 | 0.687 | 0.703 | 0.715 |
| Compression | 161 | 162.3 | 159.7 | 159.4 |
| Hardness, Shore D | 64.7 | 66.0 | 66.7 | 67.1 |

<small>Note: COR-125 row has values 0.677, 0.687, 0.703, 0.715 for C5, 14, 15, 16.</small>

TABLE 5

| | C6 | 17 | 18 |
|---|---|---|---|
| I-7 | 100 | 96.7 | 95.2 |
| AO-1 | 0 | 0.3 | 0.3 |
| Amine-1 | 0 | 3.0 | 4.5 |
| MI | | 0.67 | |
| Spheres | | | |
| COR-125 | 0.703 | 0.714 | 0.718 |
| Compression | 155.0 | 154.1 | 152 |
| Hardness, Shore D | 63.3 | 64.1 | 64.1 |

TABLE 6

| | C7 | 19 | 20 | C8 | 21 |
|---|---|---|---|---|---|
| I-8 | 100 | 96.7 | 95.2 | 0 | 0 |
| I-9 | 0 | 0 | 0 | 100 | 96.7 |
| AO-1 | 0 | 0.3 | 0.3 | 0 | 0.3 |
| Amine-1 | 0 | 3.0 | 4.5 | 0 | 3.0 |
| MI | | 2 | | | 0.86 |
| Spheres | | | | | |

TABLE 6-continued

| | C7 | 19 | 20 | C8 | 21 |
|---|---|---|---|---|---|
| COR-125 | 0.753 | 0.753 | 0.757 | 0.642 | 0.638 |
| Compression | 173.0 | 170.5 | 168 | 62.0 | 89.2 |
| Hardness, Shore D | | 67.8 | 67.6 | | 47.2 |

As summarized in the previous Tables, COR, Shore D, and Compression generally increase with addition of amine to an ionomer. Table 7 shows an example in which the ionomer is also modified with a fatty acid salt.

TABLE 7

| | C9 | 22 |
|---|---|---|
| I-12 | 100 | 96.7 |
| AO-1 | 0 | 0.3 |
| Amine-1 | 0 | 3.0 |
| MI | 0.65 | 0.79 |
| Spheres | | |
| COR-125 | 0.805 | 0.781 |
| Compression | 103 | 112.4 |
| Hardness, Shore D | 52 | 52 |

The results of experiments designed to show the effect of the addition of polyamides such as polyvinylpyrrolidone or poly(2-ethyl oxazoline) to ionomers are set forth in Tables 8 and 9. A blend of 80:20 I-5:PVP-1 showed increased compression, hardness, and COR compared to the unmodified ionomer (Table 8). Flex modulus increased twofold. A similar increase in flex modulus was observed with a poly(2-ethyl oxazoline)-modified ionomer (Table 9).

TABLE 8

| | Example | | | |
|---|---|---|---|---|
| | C10 | 23 | C11 | 24 |
| I-3 | 0 | 0 | 100 | 85 |
| I-5 | 100 | 80 | 0 | 0 |
| PVP-1 | 0 | 20 | 0 | 15 |
| MI | 0.38 | 0.13 | 1.1 | 0.07 |
| Neat Spheres | | | | |
| Specific Gravity, g/cc | 0.968 | 1.010 | | |
| Compression as measured | 153 | 170 | | |
| Hardness, Shore D | 66 | 72 | | |
| COR-125 | 0.690 | 0.735 | | |
| 2-Piece Balls | | | | |
| Compression | | | 103.4 | 93.1 |
| COR-125 | | | 0.795 | Fail** |

TABLE 8-continued

| | Example | | | |
|---|---|---|---|---|
| | C10 | 23 | C11 | 24 |
| Durability at 175 ft/sec | | | 2.2 | Fail** |
| Scuff Test | | | 3.0 | 2.8 |
| Tensile and Flex Pieces | | | | |
| Flex Modulus (Kpsi) | 49 | 108 | 73 (7) | 110 (11) |
| Hardness, Shore D | 65 | 68 | 65 | 68 |
| Tensile at Break (psi) | 2700 | 3200 | 3273 | |
| Elongation at Break (%) | 77 | 78 | 97 | |

TABLE 9

| | Example | | |
|---|---|---|---|
| | C12 | 25 | 26 |
| I-1 | 100 | 95 | 85 |
| PEO-1 | 0 | 5 | 15 |
| MI | 4.0 | 2.2 | 2.6 |

TABLE 9-continued

| | Example | | |
|---|---|---|---|
| | C12 | 25 | 26 |
| Appearance | clear | white, hazy | white, opaque |
| 2-Piece Balls | | | |
| Compression | 90.8 | 98.0 | 102.7 |
| COR-125 | 0.783 | 0.790 | 0.790 |
| Durability at 175 ft/sec | 3.8 | 2.0 | 2.0 |
| Scuff Test | 3.4 | 3.0 | 3.1 |
| Tensile and Flex Pieces | | | |
| Flex Modulus (Kpsi) | 49 (12) | 67 (10) | 99 (9) |
| Hardness, Shore D | 63 | 64 | 68 |
| Tensile at Break (psi) | 2928 | 3077 | 3414 |
| Elongation at Break (%) | 121 | 136 | 113 |

The data reported in Tables 10 and 11 show the effect of polyvinylpyrrolidinone (PVP) loading, molecular weight, and delivery (dry or aqueous solution).

TABLE 10

| | Example | | | | | | |
|---|---|---|---|---|---|---|---|
| | C12 | 27 | 28 | 29 | 30* | 31 | 32 |
| I-1 | 100 | 95 | 85 | 70 | 85 | 85 | 85 |
| PVP-1 | 0 | 5 | 15 | 30 | 15 | 0 | 0 |
| PVP-2 | 0 | 0 | 0 | 0 | 0 | 15 | |
| PVP-3 | 0 | 0 | 0 | 0 | 0 | 0 | 15 |
| MI | 4.0 | 1.7 | 0.63 | 0.2 | 0.17 | 0.53 | 0.26 |
| Appearance | | faint yellow, clear | yellow, clear | yellow, hazy | faint orange clear | yellow, clear | white, clear, surface rough |
| 2-Piece Balls | | | | | | | |
| Compression | 90.8 | 101.2 | 95.5 | 102.2 | 100.9 | 95.9 | 95.4 |
| COR-125 | 0.783 | 0.793 | 0.795 | Fail** | 0.794 | Fail** | 0.793 |
| Durability at 175 ft/sec | 3.8 | 1.0 | 3.8 | Fail** | 1.2 | Fail** | 2.8 |
| Scuff Test | 3.4 | 3.5 | 3.3 | 3.0 | 3.0 | 3.2 | 3.5 |
| Tensile and Flex Pieces | | | | | | | |
| Flex Modulus (Kpsi) | 49 (12) | 63 (8) | 118 (10) | 139 (9) | 104 (9) | 97 (8) | 112 (15) |
| Hardness, Shore D | 63 | 65 | 68 | 73 | 69 | 69 | 68 |
| Tensile at Break (psi) | 2928 | 3206 | 2937 | | | 3301 | 3408 |
| Elongation at Break (%) | 121 | 129 | 41 | | | 65 | 52 |

*passed through the extruder twice
**"failed" balls broke or were misshapen

TABLE 11

| | Example | | |
|---|---|---|---|
| | C12 | 33 | 34 |
| I-1 | 100 | 95 | 85 |
| PVP-1 (25 aq) | 0 | 5 | 0 |
| PVP-2 (50 aq) | 0 | 0 | 15 |
| MI | 4.0 | 1.9 | 0.83 |
| Appearance | | pale yellow, clear | yellow, clear |
| 2-Piece Balls | | | |
| Compression | 90.8 | 97.5 | 97.0 |
| COR-125 | 0.783 | 0.791 | Fail** |
| Durability at 175 fps | 3.8 | 2.4 | Fail** |
| Scuff Test | 3.4 | 3.0 | 3.1 |
| Tensile and Flex Pieces | | | |
| Flex Modulus (Kpsi) | 49 (12) | 77 (9) | 124 (11) |
| Shore D | 63 | 63 | 68 |
| Tensile at Break (psi) | 2928 | 3057 | 3174 |
| Elongation at Break (%) | 121 | 117 | 73 |

"n aq" means an aqueous solution with n % by weight.
**"failed" balls broke or were misshapen In Tables 12 and 13, impact durability was measured on 2-piece balls with conventional rubber cores. Compression and scuff resistance were measured on 2-piece balls with cores with nominal diameter of 3.94 cm and weight of 36.3 g prepared from 1-15 and barium sulfate.

TABLE 12

|  | Example | | | | |
| --- | --- | --- | --- | --- | --- |
|  | C13 | 35 | 36 | C14 | 37 |
| I-13 | 100 | 90 | 80 | 50 | 40 |
| I-10 | 0 | 0 | 0 | 50 | 40 |
| Amine-1 | 0 | 10 | 20 | 0 | 20 |
| MI | 2.6 | 1.3 | 3.2 | 3.5 | 2.4 |
| Neat Spheres | | | | | |
| Compression | 169 | 160 | 166 | 170 | 163 |
| Hardness, Shore D | 66.3 | 66.8 | 68.0 | 66.2 | 69.0 |
| COR-125 | 0.757 | 0.756 | 0.760 | 0.746 | 0.760 |
| 2-Piece Balls | | | | | |
| Compression | 113 | 112 | 115 | 103 | 113 |
| COR-125 | 0.836 | 0.836 | 0.832 | 0.837 | 0.834 |
| Durability at 135 fps | 136 | 102 | 1 | 100 | 31 |
| Scuff Test | 3 | 2.5 | crack | 3 | 2.5 |
| Tensile and Flex Pieces | | | | | |
| Flex Modulus (kpsi) | 71 | 84 | 101 | 74 | 102 |
| Shore D | 59.3 | 62.2 | 64.7 | 60.1 | 65.6 |
| Tensile Strength (kpsi) | 3.4 | 3.6 | 3.6 | 3.4 | 3.6 |
| Elongation at Break (%) | 103 | 107 | 106 | 103 | 71 |
| Stress at break (kpsi) | 3.4 | 3.6 | 3.6 | 3.4 | 3.6 |

The data in Table 12 illustrate that the effect of adding Amine-1 was to increase flex modulus significantly, with little change in COR.

TABLE 13

|  | Example | | | | | |
| --- | --- | --- | --- | --- | --- | --- |
|  | C15 | 38 | 39 | C16 | 40 | 41 |
| I-1 | 50 | 45 | 40 | 0 | 0 | 0 |
| I-2 | 50 | 45 | 40 | 0 | 0 | 0 |
| I-10 | 0 | 0 | 0 | 50 | 40 | 0 |
| I-14 | 0 | 0 | 0 | 50 | 40 | 80 |
| Amine-1 | 0 | 10 | 20 | 0 | 20 | 20 |
| MI | 4.5 | 4.3 | 5.0 | 2.5 | 3.0 | 4.7 |
| Neat Spheres | | | | | | |
| Compression | 174 | 157 | 166 | 168 | 162 | 168 |
| Hardness, Shore D | 68.6 | 69.9 | 72.5 | 66.5 | 68.6 | 69.4 |
| COR-125 | 0.795 | 0.784 | 0.793 | 0.758 | 0.760 | 0.763 |
| 2-Piece Balls | | | | | | |
| Compression | 112 | 113 | 112 | 110 | 113 | 113 |
| COR-125 | 0.843 | 0.842 | 0.842 | 0.837 | 0.836 | 0.839 |
| Durability at 135 fps | 99 | 78 | 1 | 136 | 44 | 45 |
| Scuff Test | 3 | 2.8 | crack | 3 | 2.5 | 3 |
| Tensile and Flex Pieces | | | | | | |
| Flex Modulus (kpsi) | 93 | 104 | 125 | 72 | 100 | 105 |
| Shore D | 63.2 | 65.6 | 68.8 | 60.0 | 65.7 | 66.1 |
| Tensile Strength (kpsi) | 3.8 | 3.7 | 3.8 | 3.3 | 3.4 | 3.3 |
| Elongation at Break (%) | 136 | 94 | 88 | 86 | 85 | 64 |
| Stress at break (kpsi) | 3.8 | 3.8 | 4.3 | 3.3 | 3.5 | 3.6 |

The data in Table 13 illustrate that the effect of adding Amine-1 was to increase flex modulus significantly, with little change in COR.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A thermoplastic composition comprising:
    (a) an E/X dipolymer; wherein E represents copolymerized units of ethylene and X represents copolymerized units of a $C_3$ to $C_8$ α,β ethylenically unsaturated carboxylic acid; wherein the amount of X is about 14 to about 20 weight %, based on the total weight of the E/X dipolymer; and wherein at least a portion of the acid moieties of the E/X dipolymer are neutralized to form an ionomer comprising carboxylate moieties and zinc cations;
    (b) a polyamine, in an amount of about 15 to about 40 weight % based on the total weight of the thermoplastic composition, said polyamine having a molecular weight of greater than 500 Da; wherein the polyamine does not contain an ester moiety or a primary amine moiety; that the polyamine comprises at least three moieties that are tertiary amines or hindered secondary amines; and optionally (c) a filler.

2. The thermoplastic composition of claim 1 wherein the amount of X is about 18 to about 22 weight %.

3. The thermoplastic composition of claim 1 wherein the polyamine consists essentially of a derivative of 2,2,6,6-tetramethylpiperidine or 4-amino-2,2,6,6-tetramethylpiperidine.

4. The thermoplastic composition of claim 1 having a flex modulus of greater than 80 kpsi measured according to ASTM D-790 B.

5. The thermoplastic composition of claim 1 having a rebound velocity of greater than 94 ft/sec, said rebound velocity measured by forming the thermoplastic composition into a sphere having a diameter of 1.50 to 1.68 inches and firing the sphere at an initial velocity of 125 ft/sec against a steel plate positioned 3 feet from the point where initial velocity is determined.

6. The thermoplastic composition of claim 1 wherein the polyamine is present in about 15 to about 30 weight % based on the total weight of the thermoplastic composition.

7. The thermoplastic composition of claim 1 wherein the polyamine is present in about 15 to about 25 weight % based on the total weight of the thermoplastic composition.

8. A multilayer golf ball comprising a core, a cover and one or more intermediate layers positioned between the core and the cover, wherein one or more of the intermediate layers comprises or is prepared from the thermoplastic composition comprising:
(a) an E/X dipolymer; wherein E represents copolymerized units of ethylene and X represents copolymerized units of a $C_3$ to $C_8$ $\alpha,\beta$ ethylenically unsaturated carboxylic acid; wherein the amount of X is about 14 to about 20 weight %, based on the total weight of the E/X dipolymer; and wherein at least a portion of the acid moieties of the E/X dipolymer are neutralized to form an ionomer comprising carboxylate moieties and zinc cations;
(b) a polyamine, in an amount of about 10 to about 40 weight % based on the total weight of the thermoplastic composition, said polyamine having a molecular weight of greater than 500 Da; wherein the polyamine does not contain an ester moiety or a primary amine moiety; that the polyamine comprises at least three moieties that are tertiary amines or hindered secondary amines; and optionally
(c) a filler.

9. The golf ball of claim 8 wherein the cover comprises or is prepared from a polyurethane composition.

10. The golf ball of claim 8 wherein the cover comprises or is prepared from an ionomer composition.

11. The golf ball of claim 8 wherein the core comprises or is prepared from an ionomer composition.

12. The golf ball of claim 11 wherein the ionomer composition comprises an ionomer derived from an E/X/Y copolymer; wherein E represents copolymerized units of (meth)acrylic acid, and Y represents copolymerized units of an alkyl ester of (meth)acrylic acid, said alkyl group having from 1 to 8 carbon atoms; wherein the amount of X is about 5 to about 15 weight % and the amount of Y is about 5 to about 40 weight %, based on the total weight of the E/X/Y copolymer;
and wherein the ionomer composition further comprises one or more fatty acids selected from the group consisting of caproic acid, caprylic acid, capric acid, lauric acid, stearic acid, isostearic acid, behenic acid, erucic acid, oleic acid, iso-oleic acid, and linoleic acid;
and wherein about 80% to about 100% of the acid moieties of the E/X/Y copolymer and of the organic acid are neutralized to form an ionomer composition comprising carboxylate moieties and cations of magnesium.

13. The golf ball of claim 8 wherein the core is a thermoset rubber core.

14. The golf ball of claim 8 wherein the cover comprises or is prepared from a polyurethane or an ionomer composition, and the thermoplastic composition has a flex modulus of greater than 80 kpsi measured according to ASTM D-790 B.

15. The golf ball of claim 8 wherein the cover comprises or is prepared from a polyurethane or an ionomer composition, wherein the thermoplastic composition, exhibits a rebound velocity of greater than 94 ft/sec, said rebound velocity measured by forming the thermoplastic composition into a sphere having a diameter of 1.50 to 1.68 inches and firing the sphere at an initial velocity of 125 ft/sec against a steel plate positioned 3 feet from the point where initial velocity is determined.

16. The golf ball of claim 8 wherein the polyamine is present in about 10 to about 30 weight % based on the total weight of the thermoplastic composition.

17. The golf ball of claim 8 wherein the polyamine is present in about 15 to about 25 weight % based on the total weight of the thermoplastic composition.

* * * * *